US008416400B2

(12) United States Patent  (10) Patent No.: US 8,416,400 B2
Cui et al.  (45) Date of Patent: Apr. 9, 2013

(54) WAVEFRONT IMAGING SENSOR

(75) Inventors: Xiquan Cui, Pasadena, CA (US);
Changhuei Yang, Pasadena, CA (US)

(73) Assignee: California Institute of Technology, Pasadena, CA (US)

(*) Notice: Subject to any disclaimer, the term of this patent is extended or adjusted under 35 U.S.C. 154(b) by 0 days.

(21) Appl. No.: 12/792,177

(22) Filed: Jun. 2, 2010

(65) Prior Publication Data

US 2010/0309457 A1 Dec. 9, 2010

Related U.S. Application Data

(60) Provisional application No. 61/183,868, filed on Jun. 3, 2009, provisional application No. 61/240,556, filed on Sep. 8, 2009.

(51) Int. Cl.
*G01J 1/00* (2006.01)

(52) U.S. Cl.
USPC .......................................................... 356/121

(58) Field of Classification Search ................... 356/121
See application file for complete search history.

(56) References Cited

U.S. PATENT DOCUMENTS

| | | | |
|---|---|---|---|
| 4,438,330 A | 3/1984 | Hardy | |
| 4,692,027 A | 9/1987 | MacGovern et al. | |
| 4,737,621 A | 4/1988 | Gonsiorowski et al. | |
| 4,980,716 A * | 12/1990 | Suzuki et al. | 396/104 |
| 4,981,362 A | 1/1991 | DeJong et al. | |
| 5,124,927 A | 6/1992 | Hopewell et al. | |
| 5,196,350 A | 3/1993 | Backman et al. | |
| 5,233,174 A | 8/1993 | Zmek | |
| 5,362,653 A | 11/1994 | Carr et al. | |
| 5,426,505 A | 6/1995 | Geiser et al. | |
| 5,795,755 A | 8/1998 | Lemelson | |
| 5,798,262 A | 8/1998 | Garini et al. | |

(Continued)

FOREIGN PATENT DOCUMENTS

| | | |
|---|---|---|
| EP | 1 371 965 | 12/2003 |
| EP | 1 635 692 | 3/2006 |

(Continued)

OTHER PUBLICATIONS

Albensi, Benedict C., et al., "Elements of Scientific Visualization in Basic Neuroscience Research," BioScience, vol. 54, No. 12, pp. 1127-1137 (Dec. 2004).

(Continued)

*Primary Examiner* — Tarifur Chowdhury
*Assistant Examiner* — Abdullahi Nur
(74) *Attorney, Agent, or Firm* — Sheila Martinez-Lemke; Weaver Austin Villeneuve & Sampson LLP

(57) ABSTRACT

Embodiments of the present invention relate to a wavefront imaging sensor (WIS) comprising an aperture layer having an aperture, a light detector having a surface and a transparent layer between the aperture layer and the light detector. The light detector can receive a light projection at the surface from light passing through the aperture. The light detector can also separately measure amplitude and phase information of a wavefront at the aperture based on the received light projection. The transparent layer has a thickness designed to locate the surface of the light detector approximately at a self-focusing plane in a high Fresnel number regime to narrow the light projection.

20 Claims, 14 Drawing Sheets

U.S. PATENT DOCUMENTS

| | | | |
|---|---|---|---|
| 5,973,316 A | 10/1999 | Ebbesen et al. | |
| 6,130,419 A | 10/2000 | Neal | |
| 6,143,247 A | 11/2000 | Sheppard, Jr. et al. | |
| 6,499,499 B2 | 12/2002 | Dantsker et al. | |
| 6,753,131 B1 | 6/2004 | Rogers et al. | |
| 6,858,436 B2 | 2/2005 | Zenhausern et al. | |
| 6,987,255 B2 | 1/2006 | Smith | |
| 7,045,781 B2 | 5/2006 | Adamec et al. | |
| 7,113,268 B2 | 9/2006 | Gerwe et al. | |
| 7,250,598 B2 | 7/2007 | Hollingsworth et al. | |
| 7,271,885 B2 | 9/2007 | Schermer | |
| 7,283,229 B2 | 10/2007 | Noguchi et al. | |
| 7,399,445 B2 * | 7/2008 | Kuroda et al. | 422/504 |
| 7,641,856 B2 | 1/2010 | Padmanabhan et al. | |
| 7,671,987 B2 | 3/2010 | Padmanabhan et al. | |
| 7,738,695 B2 | 6/2010 | Shorte et al. | |
| 7,751,048 B2 | 7/2010 | Yang et al. | |
| 7,768,654 B2 | 8/2010 | Cui et al. | |
| 7,773,227 B2 | 8/2010 | Yang et al. | |
| 7,864,333 B1 * | 1/2011 | Olczak et al. | 356/491 |
| 7,982,883 B2 | 7/2011 | Cui et al. | |
| 8,039,776 B2 | 10/2011 | Cui et al. | |
| 8,189,204 B2 | 5/2012 | Cui et al. | |
| 8,314,933 B2 | 11/2012 | Cui et al. | |
| 8,325,349 B2 | 12/2012 | Cui et al. | |
| 2003/0142291 A1 | 7/2003 | Padmanabhan et al. | |
| 2003/0174992 A1 | 9/2003 | Levene et al. | |
| 2003/0203502 A1 | 10/2003 | Zenhausern et al. | |
| 2004/0156610 A1 | 8/2004 | Charlton et al. | |
| 2004/0175734 A1 | 9/2004 | Stahler et al. | |
| 2004/0190116 A1 | 9/2004 | Lezec et al. | |
| 2004/0224380 A1 | 11/2004 | Chou et al. | |
| 2005/0007603 A1 | 1/2005 | Arieli et al. | |
| 2005/0088735 A1 | 4/2005 | Olszak | |
| 2005/0271548 A1 | 12/2005 | Yang et al. | |
| 2006/0003145 A1 | 1/2006 | Hansen et al. | |
| 2006/0013031 A1 | 1/2006 | Ravkin et al. | |
| 2006/0175528 A1 | 8/2006 | Greenaway et al. | |
| 2007/0172745 A1 | 7/2007 | Smith | |
| 2007/0207061 A1 | 9/2007 | Yang et al. | |
| 2007/0258096 A1 | 11/2007 | Cui et al. | |
| 2009/0225319 A1 | 9/2009 | Lee et al. | |
| 2009/0276188 A1 | 11/2009 | Cui et al. | |
| 2010/0195873 A1 | 8/2010 | Cui et al. | |
| 2010/0290049 A1 | 11/2010 | Yang et al. | |
| 2010/0296094 A1 | 11/2010 | Yang et al. | |
| 2011/0063623 A1 | 3/2011 | Cui et al. | |
| 2011/0075254 A1 | 3/2011 | Cui et al. | |
| 2011/0085219 A1 | 4/2011 | Yang et al. | |
| 2011/0170105 A1 | 7/2011 | Cui et al. | |
| 2011/0181884 A1 | 7/2011 | Cui et al. | |
| 2012/0026509 A1 | 2/2012 | Cui et al. | |
| 2012/0061554 A1 | 3/2012 | Cui et al. | |
| 2012/0211644 A1 | 8/2012 | Zheng et al. | |
| 2012/0250027 A1 | 10/2012 | Zheng et al. | |

FOREIGN PATENT DOCUMENTS

| | | |
|---|---|---|
| EP | 1 787 156 | 5/2007 |
| JP | 2003-207454 A | 7/2003 |
| JP | 2003-0524779 A | 8/2003 |
| JP | 2004-505272 A | 2/2004 |
| WO | WO 02/10713 A2 | 2/2002 |
| WO | WO 2004/038484 A2 | 5/2004 |
| WO | WO 2005/121749 | 12/2005 |
| WO | WO 2008/112416 | 9/2008 |
| WO | WO 2009/111573 | 9/2009 |
| WO | WO 2009/111577 | 9/2009 |
| WO | WO 2010/090849 | 8/2010 |
| WO | WO 2010/141702 | 12/2010 |

OTHER PUBLICATIONS

Anand Arun, et al., "Wavefront sensing with random amplitude mask and phase retrieval," Optics Letters, vol. 32, No. 11, pp. 1584-1585 (Jun. 2007).

Arnison, M. R., et al , "Linear Phase Imaging Using Differential Interference Contrast Microscopy," Journal of Microscopy, vol. 214, Part I. pp. 7-12 (Apr. 2004).

Barty, A., et al., "Quantitative optical phase microscopy," Optics Letters, vol. 23, pp. 817-819 (1998).

Betzig Eric, et al., "Imaging Intracellular Fluorescent Proteins at Nanometer Resolution," Science, vol. 313, pp. 1642-1645 (Sep. 2006).

Booth, Martin J , et al. , "Adaptive aberration correction in confocal microscope" Proceedings of the National Academy of Sciences of the United States of America, vol. 99, No. 9, pp. 5788-5792 (Apr. 2002).

Bouwkamp, C. J., "Diffraction theory," Reports on Progress in Physics XVIII, pp. 35-100 (1954).

Carmon, Yuval, and Ribak, Erez N., "Phase retrieval by demodulation of a Hartmann-Shack sensor," Opt. Commun. vol. 215, pp. 285-238 (2003).

Chalut, Kevin J., et al., "Quantitative phase microscopy with asynchronous digital holography," Optics Express, vol. 15, No. 6, pp. 3047-3052 (Mar. 2007).

Choi, Worishik, et al., "Tornographic phase microscopy," Nature Methods, vol. 4, No. 9, pp. 717-719 (Sep. 2007).

Cogswell C. J., et al., "Confocal differential contrast interference (DIC) microscopy: including a theoretical analysis of conventional and confocal DIC imaging," Journal of Microcscopy, vol. 165, Pt. 1, pp. 81-101 (Jan. 1992).

Creath, Katherine, "Phase-measurement interferometry techniques;" Prog. Opt., vol. 26, pp. 349-393 (1988).

Cui, Xiquan, et al., "Portable optical microscope-on-a-chip," P(roc. of SPIE, vol. 6095. pp. 609509-1-609509-8 (Jan. 2006).

Cui, Xiquan, et al., "Quantitative differential interference contrast microscopy based on structured-aperture interference," Applied Physics Letters, vol. 93, pp. 091113-1-091113-3 (2008).

Cui, Xiquan, et al., "Slanted hole array beam profiler (SHArP)—a high-resolution portable beam profiler based on a linear aperture array," Optics Letters, vol. 31, No. 21, pp. 3161-3163 (Nov. 2006).

Davidson, Michael, et al., "Differential interference contrast, 'Comparison of wavelength of DIC microscopy'," Florida State University website, last website, modification Jul. 26, 2005, printed Apr. 13, 2009, 12 pages.

Doyle, Patrick, et al., "Sef-Assembled Magnetic Matrices for DNA Separation Chips," Science, vol. 295, No. 5563, p. 2237 (Mar. 2002).

Dunn, et al., "Introduction to Confocal Microscopy," available from MicroscopyU at http://microscopyu.com/articles/confocal (2007).

Ebbesen, T. W., et al., "Extraordinary optical transmission through sub-wavelength hoie arrays," Nature, vol. 391 (6668), pp. 667-669 (Feb. 1998).

Fletcher, R., and Reeves, C. M., "Function minimization by conjugate gradients," Comput. J. 7, 49-154 1964).

Fu, Anne Y., et al., "A microfabricated fluorescence-activated cell sorter," Nature Biotechnology, vol. 17, pp. 1109-1111 (Nov. 1999).

Garcia De Abajo, F. J., "Light transmission through a single cylindrical hole in a metallic film," Optics Express, vol. 10, No. 25, pp. 1475-1484 (2002).

Haglund, Michael M., et al., "Enhanced Optical Imaging of Human Gliomas and Tumor Margins," Neurosurgery, vol. 38, pp. 308-317 (Feb. 1996).

Heng, Xin, et al., "Optofluidic Microscope, a miniature microscope on a chip," 9th International Conference on Miniaturized Systems for Chemistry and Life Sciences (µTAS) (2005).

Heng, Xin, et al., "Optofluidic Microscopy—a method for implementing a high resolution optical microscope on a chip," Lab Chip, vol. 6, pp. 1274-1276 (2006).

Hoffman, Robert, and Gross, Leo, "Modulation Contrast Microscope " Applied Optics vol. 14, No. 5, pp. 169-1176 (May 1975).

Hogenboom, D. O., et al., "Three-dimensional images generated by quadrature interferometry," Optics Letters, vol. 23, No. 10, pp. 783-185 (May 1998).

Ikeda, Takahiro, et al., "Hilbert phase microscopy for investigating fast dynamics in transparent systems," Optics Letters; vol. 30, No. 10, pp. 1165-1167 (May 2005).

Kagalwala, Farhana, and Kanade: Takeo, "Reconstructing Specimens Using DIC Microscope Images," IEEE Transactions on Systems, Man; and Cybernetics-Part B: Cybernetics, vol. 33, No. 5 pp. 307-315 (Oct. 2003).

Lew, Matthew, et al., "Interference of a four-hole aperture for on-chip quantitative two-dimensional differential phase imaging," Optics Letters, vol. 32, No. 20, pp. 2963-2965 (Oct. 2007).

Lezec, Henri J., et al., "Beaming Light from a Subwavelength Aperture," Science, vol. 297, No. 5582. pp. 820-822 (Aug. 2002).

Lezec, Henri J., and Thio, Tineke, "Diffracted evanescent wave mode for enhanced and suppressed optical transmission through subwavelength hole arrays," Optics Express, vol. 12, No. 16, pp. 3629-3651 (Aug. 2004).

Liang, Junzhong Z., et al., "Supernormal vision and high-resolution retinal imaging through adaptive optics," Journal of the Optical Society of America, vol. 14, No. 11, pp. 2884-2892 (Nov. 1997).

Liu, Shaorong, "A microfabricated hybrid device for DNA sequencing," Electrophoresis 2003, vol. 24(2 pp. 3755-3761 (2003).

Marquet, Pierre, et al.; "Digital holographic microscopy: a noninvasive contrast imaging technique allowing quantitative visualization of living cells with subwaveiength axial accuracy," Optics Letters, vol. 30, No. 5, pp. 468-470 (Mar. 2005).

Mehta, Shalin B., and Sheppard, Colin J. R., "Quantitative phase-gradient imaging at high resolution with asymmetric illumination-based differential phase contrast," Optics Letters; vol. 34, No. 13, pp. 1924-1926 (Jul. 2009).

Murphy. et al., "Differential Interference Contrast (DIC)" available from Nikon MicrocopyU at http://www.microscopyu.com/articles/dic/dicindex.html (2007).

Popescu, Gabriel, et al., "Diffraction phase microscopy for quantifying cell structure and dynamics," Optics Letters, vol. 31, No. 6, pp. 775-777 (Mar. 2006).

Popescu, Gabriel, et al., "Optical Measurement of Cell Membrane Tension," Physical Review Letters 97, pp. 218101-1-218101-4 (Nov. 2006).

Preza, Chrysanthe, "Rotational-Diversity Phase Estimation from Differential-Interference Contrast Microscopy Images" J. Opt. Soc. Am. A, vol. 17, No. 3 (Mar. 2000).

Rappaz, Benjamin, et al., "Measurement of the integral refractive index and dynamic cell morphometry of living cells with digital holographic microscopy," Optics Express, vol, 13, pp. 9361-9373 (Nov. 2005).

Rueckel, Markus, et al., "Adaptive wavefront correction in two-photon microscopy using coherence-gated wavefront sensing," Proceedings of the National Academy of Sciences of the USA, vol. 103, No. 46, pp. 17137-17142 (Nov. 2006).

Rust Michael J. et al.. "Sub-diffraction-limit imaging by stochastic optical reconstruction microscopy (STORM)," Nature Methods, vol. 3, No. 10, pp. 793-795 (Oct. 2006).

Sarunic, Marinko V., et al., "Full-field swept-source phase microscopy," Optics Letters, vol. 31, No. 10, pp. 1462-1464 (May 2006).

Schwiegerling, Jim, and Neal, Daniel,"Historical Development of the Shack-Hartmann Wavefront Sensor," in Robert Shannon and Roland Shack: Legends in Applied Optics, edited J. E. Harvey and R. B. Hooker_SPIE, Bellingham, WA, pp. 132-139 (2005).

Sommer, Ralf J., and Sternberg. Paul W., "Changes of Induction and Competence During the Evolution of Vulva Development in Nematodes," Science, vol. 265, pp. 114-118 (Jul. 1994).

Stanley, Samuel L. Jr, "Amoebiasis," The Lancet, vol. 361, pp. 1025-1034 (Mar. 2003).

Tegenfeldt, Jonas O., et al., "Micro- and nanofluidics for DNA analysis," Analytical and Bioanalytica Chemistry, 378(7), pp. 1678-1692 (Mar. 2004).

Tegenfeldt, Jonas O., et al., "Near-Field Scanner for Moving Molecules," Physical review letters, vol. 88, No. 7, pp. 1378-1381 (Feb. 2001).

Thompson, Russell E., et al., "Precise Nanometer Localization Analysis for Individual Fluorescent Probes," Biophysical Journal, vol. 82, No. 5, pp. 2775-2783 (May 2002).

Tokeshi, Manabu, et al., "Chemical processing on microchips for analysis, synthesis, and bioassay," Electrophoresis, vol. 24, No. 21, pp. 3583-3594 (2003).

Trau, Dieter, et al., "Genotypirig on a complementary metal oxide semiconductor silicon polymerase chain reaction chip with integrated DNA microarray," Analytical Chemistry, vol. 74, No. 13, pp. 3168-3173 (2002).

Wu, Jigang, et al., "Full field phase imaging using a harmonically matched diffraction grating pair based homodyne quadrature interferometer," Applied Physics Letters, vol. 90, pp. 151123-1-151123-3 (Apr. 2007).

Yaqoob, Zahid et al., "Harmonically-related diffraction gratings-based interferometer for quadrature phase measurements," Optics Express, vol. 14, No. 18, pp. 8127-8137 (2006).

Zernike, R., "Phase contrast, a new method for the microscopic observation of transparent objects," Physica IX, pp. 974-986 (Dec. 1942).

Wikipedia, "Adaptive optics," last modified Mar. 17, 2009.

Wikipedia, "Differential interference contrast microscopy," last modified Feb. 10, 2009.

Wikipedia, "Fresnel number," last modified on May 2, 2010.

Wikipedia, "Shack-Hartmann," last modified on Mar. 30, 2009.

Wikipedia, "Zone plate," last modified Apr. 2, 2009.

Abramowitz et al., "Numerical Aperture and Resolution," Olympus Resource Center, downloaded from the Internet at: http://www.olympusmicro.com/primer/anatomy/numaperture.html on Aug. 13, 2012.

Adams, Mark L., et al., "Microfluidic Integration on detector arrays for absorption and fluorescence micro-spectrometers," *Sensors and Actuators A*, vol. 104, pp. 25-31 (2003).

Betzig, E., et al., "Imaging intracellular fluorescent proteins at nanometer resolution," Science, vol. 313, pp. 1642-1645 (2006).

Chronis, Nikolas, et al., "Total internal reflection-based biochip utilizing a polymer-filled cavity with a micromirror sidewall," *Miniaturisation for Chemistry, Biology & Bioengineering, Lab Chip*, vol. 4, pp. 125-130 (2004).

Dahan, M., et al., "Time-gated biological imaging by use of colloidal quantum dots," *Optics Letters*, vol. 26, No. 11, pp. 825-827 (2001).

Fowles, G. R., Introduction to Modern Optics, *Dover Publications, Second Ed.*, New York, pp. 57-61 (1989).

Heng, Xin, "OptoFuidic Microscopy (OFM)" *Biophotonics Group, Caltech, DARPA optofluidic center retreat*, Apr. 1, 2005, 9 pp.

Kraus, J.D. and Fleisch, D.A., Electromagnetics with Applications (5th Ed), Chapters 4-16 (1999).

Laux, E., et al., "Plasmonic photon sorters for spectral and polarimetric imaging," Nature Photonics, vol. 2, pp. 161-164 (2008).

Leen, J., et al. "Improved focused ion beam fabrication of near-field apertures using a silicon nitride membrane," Optics Letters, vol. 33, pp. 2827-2829 (2008).

Platt, B.C. and Shack, R., History and Principles of Shack-Hartmann Wavefront Sensing, *Journal of Refractive Surgery* 17, pp. S573-S577.

Seo, Jeonggi, et al., "Disposable integrated microfluidics with self-aligned planar microlenses," *Sensors and Acutators B*, vol. 99, pp. 615-622 (2004).

Thio, T., et al., "Enhanced light transmission through a single subwavelength aperture," Opt. Lett., vol. 26, pp. 1972-1974 (2001).

Thio, T., et al., "Giant optical transmission of sub-wavelength apertures: physics and applications," Nanotehnology, vol. 13, pp. 429-432 (2002).

PCT International Search Report dated Oct. 16, 2006 issued in PCT/US2005/016876.

PCT Written Opinion dated Oct. 16, 2006 issued in PCT/US2005/016876.

PCT International Search Report dated Aug. 26, 2008 issued in PCT/US2008/054908.

PCT Written Opinion dated Aug. 26, 2008 issued in PCT/US2008/054908.

PCT International Search Report dated Apr. 23, 2009 issued in PCT/US2009/036045.

PCT Written Opinion dated Apr. 23, 2009 issued PCT/US2009/036045.

PCT International Search Report dated Jun. 29, 2009 issued in PCT/2009/036052.

PCT Written Opinion dated Jun. 29, 2009 issued in PCT/2009/036052 mailed on Jun. 29, 2009.

PCT International Search Report and Written Opinion dated Jun. 29, 2010 issued in PCT/US2010/021561.

PCT International Preliminary Report on Patentability and Written Opinion dated Aug. 4, 2011 issued in PCT/US2010/021561.

PCT International Search Report and Written Opinion dated Dec. 20, 2010 issued in PCT/US2010/037235.
PCT Preliminary Report on Patentability and Written Opinion dated Dec. 15, 2011 issued in PCT/US2010/037235.
European Patent Office (EPO) European Supplementary Search Report in EP Application No. 05 74 9488.2 mailed on Jan. 26, 2012.
European Patent Office (EPO) Office Action in EP Application No. 05 749 488.2 mailed on Jun. 27, 2012.
European Patent Office (EPO) European Supplementary Search Report in EP Patent Application No. 08 730 664.3 mailed Feb. 7, 2012.
Japanese Patent Office (JPO) Office Action in JPO patent Application No. 2007-515164 dated Jul. 26, 2011.
Japanese Patent Office (JPO) Office Action in JPO patent Application No. 2007-515164 May 8, 2012.
Japanese Patent Office (JPO) Office Action in JPO patent Application No. 2009-553675 Jan. 24, 2012.
European Patent Office (EPO) European Supplementary Search Report in EP Patent Application No. 10738939.7 mailed on Jun. 11, 2012.
United States Patent and Trademark Office (USPTO) Office Action in U.S. Appl. No. 11/125,718 mailed on Nov. 14, 2008.
United States Patent and Trademark Office (USPTO) Final Office Action in U.S. Appl. No. 11/125,718 mailed on Jul. 1, 2009.
United States Patent and Trademark Office (USPTO) Notice of Allowance in U.S. Appl. No. 11/125,718 mailed on Mar. 11, 2010.
United States Patent and Trademark Office (USPTO) Office Action in U.S. Appl. No. 12/797,132 mailed on Oct. 15, 2010.
United States Patent and Trademark Office (USPTO) Office Action in U.S. Appl. No. 11/686,095 mailed on Jan. 10, 2008.
United States Patent and Trademark Office (USPTO) Office Action in U.S. Appl. No. 11/686,095 mailed Jul. 17, 2008.
United States Patent and Trademark Office (USPTO) Office Action in U.S. Appl. No. 11/686,095 mailed Feb. 26, 2009.
United States Patent and Trademark Office (USPTO) Final Office Action in U.S. Appl. No. 11/686,095 mailed on Oct. 28, 2009.
United States Patent and Trademark Office (USPTO) Notice of Allowance in U.S. Appl. No. 11/686,095 mailed on Feb. 25, 2010.
United States Patent and Trademark Office (USPTO) Office Action in U.S. Appl. No. 12/785,635 mailed on Oct. 15, 2010.
United States Patent and Trademark Office (USPTO) Restriction Requirement in U.S. Appl. No. 12/398,050 mailed on Aug. 10, 2011.
United States Patent and Trademark Office (USPTO) Office Action in U.S. Appl. No. 12/398,050 mailed on Nov. 14, 2011.
United States Patent and Trademark Office (USPTO) Notice of Allowance in U.S. Appl. No. 12/398,050 mailed on Jul. 17, 2012.
United States Patent and Trademark Office (USPTO) Notice of Allowance in U.S. Appl. No. 12/398,050 mailed on Aug. 28, 2012.
United States Patent and Trademark Office (USPTO) Office Action in U.S. Appl. No. 12/638,518 mailed on Jan. 12, 2012.
United States Patent and Trademark Office (USPTO) Notice of Allowance in U.S. Appl. No. 12/638,518 mailed on Feb. 14, 2012.
United States Patent and Trademark Office (USPTO) Notice of Allowance in U.S. Appl. No. 12/638,518 mailed on Apr. 23, 2012.
United States Patent and Trademark Office (USPTO) Notice of Allowance in U.S. Appl. No. 12/638,518 mailed on Aug. 24, 2012.
United States Patent and Trademark Office (USPTO) Office Action in U.S. Appl. No. 12/398,098 mailed on May 25, 2011.
United States Patent and Trademark Office (USPTO) Final Office Action in U.S. Appl. No. 12/398,098 maied on Nov. 23, 2012.
United States Patent and Trademark Office (USPTO) Office Action in U.S. Appl. No. 11/743,581 mailed on May 22, 2009.
United States Patent and Trademark Office (USPTO) Final Office Action in U.S. Appl. No. 11/743,581 mailed on Dec. 3, 2009.
United States Patent and Trademark Office (USPTO) Notice of Allowance in U.S. Appl. No. 11/743,581 mailed Mar. 26, 2010.
United States Patent and Trademark Office (USPTO) Notice of Allowance in U.S. Appl. No. 12/823,201 mailed Mar. 1, 2011.
United States Patent and Trademark Office (USPTO) Notice of Allowance in U.S. Appl. No. 12/823,201 mailed on Mar. 11, 2011.
United States Patent and Trademark Office (USPTO) Office Action in U.S. Appl. No. 13/157,245 mailed on Dec. 6, 2011.

United States Patent and Trademark Office (USPTO) Notice of Allowance in U.S. Appl. No. 13/157,245 mailed on Aug. 23, 2012.
United States Patent and Trademark Office (USPTO) Notice of Allowance in U.S. Appl. No. 12/792,059 mailed on Dec. 14, 2011.
United States Patent and Trademark Office (USPTO) Office Action in U.S. Appl. No. 12/435,165 mailed on Apr. 12, 2011.
United States Patent and Trademark Office (USPTO) Notice of Allowance in U.S. Appl. No. 12/435,165 mailed on Jun. 10, 2011.
United States Patent and Trademark Office (USPTO) Notice to File Corrected Application Papers in U.S. Appl. No. 12/435,165 mailed on Jul. 25, 2011.
United States Patent and Trademark Office (USPTO) Office Action in U.S. Appl. No. 12/690,952 mailed on Oct. 5, 2012.
United States Patent and Trademark Office (USPTO) Office Action in U.S. Appl. No. 13/299,741 mailed on Apr. 12, 2012.
"Surface Plasmon," Wikipedia, last modified Apr. 4, 2010.
Aigouy, L., et al., "Near-field analysis of surface waves launched at nanoslit apertures," *Physical Review Letters*, vol. 98, p. 153902 (2007).
Allen et al., "The Zeiss-Nomarski differential interference equipment for transmitted light microscopy," *Z. wiss. Mikr* 69, 89 (1969).
Aroian et al., "Multiple functions of *let-23*, a Caenorhabditis elegans recetor tyrosine kinase gene required for vulval induction," *Genetics* 128, 251-267 (1991).
Beebe, David J., et al., "Physics and Applications of Microfluidics in Biology," *Annu. Rev. Biomed., Eng.,* vol. 4, pp. 261-286 (2002).
Bethe, H.A., "Theory of Diffraction by Small Holes" *The Physical Review*, vol. 66, Nos. 7-8, pp. 163-182 (1944).
Biddiss, Elaine, et al., "Heterogeneous Surface Charge Enhanced Micromixing for Electrokinetic Flows," *Anal. Chem.*, vol. 76, pp. 3208-3213 (2004).
Boppart, S.A., et al., "Forward-imaging instruments for optical coherence tomography," *Optics Letters* vol. 22, pp. 1618-1620 (1997).
Cao, Jinhua, et al., "Brownian Particle Distribution in Tube Flows," *Proceedings of IMECE04*, vol. 260, pp. 243-252 (2004).
Chen, L., et al. "Role of radiation and surface plasmon polaritons in the optical interactions between a nano-slit and a nano groove on a metal surface," *Optics Express*, vol. 14, pp. 12629-12636 (2006).
Cheng, Ya, et al. "Microfluidic laser embedded in glass by three-dimensional femtosecond laser microprocessing," *Optics Letters*, vol. 29, No. 17, pp. 2007-2009 (2004).
Chovin, Arnaud, et al., "Fabrication, Characterization, and Far-Field Optical Properties of and Ordered Array Nanoapertures," *Nano Letters*, vol. 4, No. 10, pp. 1965-68 (2004).
Courjon, Daniel, "Near-filed Microscopy and near-filed optics," *Imperial College Press*, 317 pages (2003).
Cui et al., "Wavefront Image Sensor Chip," *Optics Express* 18(16), 16685-16701, 2010.
Cui, X. et al., "Portable Optical microscope-on-a-chip," *Photonics West*, San Jose, CA Jan. 2006, 8 pp.
Cui, Xiquan, et al., "Lensless high-resolution on-chip optofluidic microscopes for *Caenorhabditis* elegans and cell imaging," *Proceedings of the National Academy of Sciences of the United States of America*, vol. 105, pp. 10670-10675 (2008).
De Fornel, F., "Evanscent waves from Newtonian opticsand Atomic optics," *Springer Series in Optical Sciences*, 270 pages (2001).
Drezet, A., et al., "Miniature Plasmonic Wave Plates," *Physical Review Letters*, vol. 101, pp. 43902-1-043902-4 (Jul. 25, 2008).
Ferguson et al., "Identification and characterization of 22 genes that affect the vulval vell lineages of the nematode *Caenorhabditis* elegans," *Genetics* 110, 17-72 (1985).
Gay, G., et al., "The optical response of nanostructured surfaces and the composite diffracted evanescent wave model," *Nat Phys*, vol. 2, pp. 262-267 (2006).
Gbur, G., et al., "Achieving superresolution in near-field optical data readout systems using surface plasmons," *Applied Physics Letters*, vol. 87, p. 191109 (2005).
Genet et al., "Light in tiny holes," *Nature* 445, 39-46 (2007).
Heng, Xin, et al., "Optofluidic Microscopy," *Proceedings of the ICMM 2005 3rd International Conference on Microchannels and Minichannels*, pp. 1-6 (2005).

Heng, Xin, et al., "Characterization of light collection through a subwavelength aperture from a point source," *Optics Express*, vol. 14, pp. 10410-10425 (2006).

Heng, Xin, et al., "An Optical Tweezer Actuated, Nanoaperture-grid based Optofluidic Microscope implimentation Method," *Optics Express*, vol. 15, No. 25, 16367-75 (2007).

Jaiswal, Jyoti K., et al., "Long-term multiple color imaging of live cells using quantum dot biconjugates," *Nature Biotechnology*, vol. 21, pp. 47-51 (2003).

Lalanne, P., and Hugonin, J., "Interaction between optical nano-objects at metallo-dielectric interfaces," *Nature Physics*, vol. 2, p. 551 (2006).

Lay, Christophe, et al., "Enhanced microfiltration devices configured with hydrodynamic trapping and a rain drop bypass filtering architecture for microbial cells detection," *Lab on a Chip* 2008, 8:830-833; published as Advanced Article on Apr. 1, 2008 at http://pubs.rsc.org | DOI:10.1039/b800015h, 4 pp.

Lee, Lap Man, et al., "The Application of On-Chip Optofluidic Microscopy for Imaging Giardia lamblia Trophozoites and Cysts," *Biomed Microdevices*, Springer DOI 10.1007/s10544-009-9312-X (2009) 11:951-958.

Liu, H., and Lalanne, P., "Microscope theory of the extraordinary optical transmission," *Nature*, vol. 452, pp. 728-731 (2008).

Minakawa, K., et al., "Microchamber Device Equipped with Complementary Metal OXide Semiconductor Optical Polarization Analyzer Chip for Micro Total Analysis System," *Jpn. J. Appl. Phys.*, vol. 48, p. 04C192 (2009).

Ng, R., et al., "Light field photography with hand-held plenoptic camera," *Computer Science Technical Report CSTR*, vol. 2 (2005).

Nott, Prabhu R., et al., "Pressure-driven flow of suspensions: simulation and theory," (1994), *J. Fluid Mech.*, vol. 275, pp. 157-199.

Nozokido, Tatsuo, et al., "Scanning Near-Filed Millimeter-Wave Microscopy Using a Metal Slit as a Scanning Probe," *IEEE Transactions on Microwave Theory and Techniques*, vol. 49, No. 3, 491-99 (2001).

Ogg et al., "The *C. elegans* PTEN homolog, DAF-18, acts in the insulin receptor-like metabolic signaling pathway," *Mol. Cell* 2, 887-893 (1998).

Pacifici, D., et al., "All-optical modulation by plasmonic excitation of CdSe quantum dots," *Nature photonics*, vol. 1, pp. 402-406 (2007).

Pacifici, D., et al., "Quantitative determination of optical transmission through subwavelength slit arrays in Ag films: Role of surface wave interference and local coupling between adjacent slits," *Physical Review B*, vol. 77, p. 115411 (2008).

Pacifici, D., et al., "Universal optical transmissions feature in periodic and quasiperiodic hole arrays," *Optics Express*, vol. 16, pp. 9222-9238 (2008).

Probstein, R. F., "Physicochemical Hydrodynamics," Wiley, 2nd Edition pp. 109-116, 123, 190-197, and 309-310 (2003).

Psaltis, Demetri, et al., "Developing optofluidic technology technology through the fusion of microfluidics and optics," *Nature*, vol. 442, 6 pp (2006).

Schouten, H., et al., "Plasmon-assisted two-slit transmission: Young's experiment revisited," *Phyiscal Review Letters*, vol. 94, p. 53901 (2005).

Segre, G., et al., "Behavior of macroscopic rigid spheres in Poiseuille flow: Part 1. Determination of local concentration by statistical analysis of partical passages through crossed light beams," *J. Fluid Mech.*, vol. 14, pp. 115-135 (1962).

Segre, G., et al., "Behavior of macroscopic rigid spheres in Poiseuille flow: Part 2. Experimental results and interpretation," *J. Fluid Mech.*, vol. 14, pp. 136-157 (1962).

Shi, X., et al., "Ultrahigh light transmission through a C-shaped manoaperture," *Optics letters*, vol. 28, pp. 1320-1322 (2003).

Spring, Kenneth R., et al., "Introduction to Fluorescence Microscopy," <http://www.microscopyu.com/articles/fluorescence/fluorescenceintro.html> (Aug. 25, 2004), 13 pp.

Stone, H.A., et al., "Engineering Flows in Small Devices: Microfluidics Toward a Lab-on-a-Chip," *Annu. Rev. Fluid Mech.*, vol. 36, pp. 381-411 (2004).

Tearney, G. J., et al., "Scanning single-mode fiber optic catheter-endoscope for optical coherence tomography," *Optics Letters*, vol. 21, pp. 543-545 (1996).

Thorsen, Todd, et al., "Microfluidic Large-Scale Integration," *Science*, vol. 298, pp. 580-584 (2002).

Trent et al., "Egg laying defective mutants of the nematode *Caenorhabditis elegans*," *Genetics* 104, 619-647 (1983).

Ung, B., and Sheng, Y., "Optical surface waves over metallo-dielectric nanostructures: Sommerfeld integrals revisited," *Optics Exprss*, vol. 16, pp. 9073-9086 (2008).

Walker, Glenn, and Beebe, David, "A Passive Pumping Method for Microfluidic Devices," *Lab Chip*, pp. 131-134 (2002).

Yu, N., et al., "Semiconductor lasers with integrated plasmonic polarizers," *Applied Physics Letters*, vol. 94, p. 151101, 2009.

Zernike, F., "Phase contrast, a new method for the microscopic observation of transparent objects," *Physics IX*, pp. 686-698 (1942).

Zheng et al., "Improving Weak-Signal Identification via Predetection Background Suppression by a Pixel-Level, Surface-Wave Enabled Dark-Field Aperture," *Optics Letters* 35(15), 2636-2638, 2010.

Zheng, Guoan, et al., "Surface-wave-enabled darkfield aperture: A method for suppressing background during weak signal detection," *PNAS USA*, vol. 107, No. 20, pp. 9043-9048 (May 2010).

Zhu, Liang, et al., "Filter-based microfluidic device as a platform for immunofluorescent assay microbial cells," *Lab Chip*, 2004, vol. 4, pp. 337-341; published as Advanced Article on Apr. 5, 2004 at http://pubs.rsc.org | DOI:10.1039/b401834f, 5 pp.

\* cited by examiner

WAVEFRONT IMAGING SENSOR

CROSS-REFERENCES TO RELATED APPLICATIONS

This is a non-provisional application of and claims priority to U.S. Provisional Patent Application No. 61/183,868 entitled "Functionalized CMOS Sensor Chips for Wavefront and Darkfield Microscopy" filed on Jun. 3, 2009 and Provisional Patent Application No. 61/240,556 entitled "Wavefront Imaging Sensor" filed on Sep. 8, 2009. These provisional applications are hereby incorporated by reference in their entirety for all purposes.

This non-provisional application is related to the following co-pending and commonly-assigned patent applications, which are hereby incorporated by reference in their entirety for all purposes:

U.S. patent application Ser. No. 11/125,718 entitled "Optofluidic Microscope Device" filed on May 9, 2005.

U.S. patent application Ser. No. 11/686,095 entitled "Optofluidic Microscope Device" filed on Mar. 14, 2007.

U.S. patent application Ser. No. 11/743,581 entitled "On-chip Microscope/Beam Profiler based on Differential Interference Contrast and/or Surface Plasmon Assisted Interference" filed on May 2, 2007.

U.S. patent application Ser. No. 12/398,098 entitled "Methods of Using Optofluidic Microscope Devices" filed Mar. 4, 2009.

U.S. patent application Ser. No. 12/398,050 entitled "Optofluidic Microscope Device with Photosensor Array" filed on Mar. 4, 2009.

U.S. patent application Ser. No. 12/638,518 entitled "Techniques for Improving Optofluidic Microscope Devices" filed on Dec. 15, 2009.

U.S. patent application Ser. No. 12/435,165 entitled "Quantitative Differential Interference Contrast (DIC) Microscopy and Photography based on Wavefront Sensors" filed May 4, 2009.

U.S. patent application Ser. No. 12/690,952 entitled "Quantitative Differential Interference Contrast (DIC) Microscopy and its Computed Depth Sectioning Ability" filed on Jan. 21, 2010.

The following non-provisional patent application is being filed on the same day and is hereby incorporated by reference in its entirety for all purposes: U.S. patent application Ser. No. 12/792,059 filed on Jun. 2, 2010 entitled "Surface Wave Enabled Darkfield Aperture".

BACKGROUND OF THE INVENTION

Embodiments of the present invention generally relate to phase sensing devices used in applications such as microscopy and photography. More specifically, certain embodiments relate to a wavefront imaging sensor (WIS) configured to measure phase variations and/or amplitude variations of a light field in a high Fresnel number regime.

A light field contains two primary sets of characteristics—amplitude/intensity and phase front variations. At present, commercial optical sensors are designed to operate much like our retina and are only responsive to light field amplitude/intensity variations.

The phase of light is very important for imaging because many objects, such as transparent organisms and cells, only significantly modulate the phase of transmitted light and do not change the amplitude/intensity much. Sometimes, contrast agents (e.g., stains) can be used to generate amplitude/intensity variations in these transparent objects, however staining involves preparation and can damage specimens. For this reason and others, phase microscopes are highly valued in biomedical applications for their ability to render contrast based on refractive index variations in unstained biological samples. Such applications include field analyses of blood-borne and waterborne pathogens where cost considerations and ease-of-use are important, and analysis of biopsy sections to determine tumour margins during surgical procedures where rapid processing is critical. Phase microscopes are also useful where staining is undesirable or simply not an option. Such applications include examinations of oocytes and embryos during in-vitro fertilization procedures, and longitudinal imaging of live cells or organisms. Examples of these applications can be found in S. L. Stanley, "Amoebiasis," Lancet 361, 1025-1034 (2003), M. M. Haglund, M. S. Berger, and D. W. Hochman, "Enhanced optical imaging of human gliomas and tumor margins," Neurosurgery 38, 308-317 (1996), J. Vanblerkom, H. Bell, and G. Henry, "The occurrence, recognition and developmental fate of pseudo-multi-pronuclear eggs after in-vitro fertilization of human oocytes," Hum. Reprod. 2, pp. 217-225 (1987) and R. J. Sommer, and P. W. Sternberg, "Changes of induction and competence during the evolution of vulva development in nematodes," Science 265, 114-118 (1994), which are hereby incorporated by reference in their entirety for all purposes.

Conventional differential interference contrast (DIC) microscopes and, to a lesser extent, phase contrast microscopes and Hoffman phase microscopes have been the primary phase microscopes used in the past five decades. FIG. 1(a) is a schematic illustration of the underlying principle of a conventional DIC device (e.g., such as a conventional DIC microscope or camera). A conventional DIC device operates by interfering slightly displaced duplicate image light fields of polarized light. FIG. 1(b) is a schematic drawing of a conventional DIC device. An example of a phase contrast microscope can be found in F. Zernike, "Phase contrast, a new method for the microscopic observation of transparent objects," Physics 9, 686-698 (1942). An example of a Hoffman phase microscope can be found in R. Hoffman, and L. Gross, "The modulation contrast microscope," Nature 254, 586-588 (1975). An example of a conventional DIC microscope can be found in G. Nomarski, "New theory of image formation in differential interference microscopy," Journal of the Optical Society of America 59, 1524-& (1969), and an imaging strategy used by a conventional DIC microscope can be found in "DIC," http://www.microscopyu.com/articles/dic/dicindex.html, (2007). These three references are incorporated by reference in their entirety for all purposes.

However, these conventional phase microscopes have several limitations. One major limitation of the techniques used by these conventional devices is that phase variations are inextricably mixed with the amplitude/intensity variations that arise from absorption and/or scattering by an object. As a consequence of this entanglement of amplitude and phase information, these conventional techniques do not provide quantitative phase measurements. This limitation can introduce ambiguities in the rendered image of the object. Another limitation of conventional DIC devices is that they use polarized light and depend on the polarization in their phase-imaging strategies. Since polarized light must be used, conventional DIC devices generate images of birefringent samples, such as muscle sections and collagen matrices that typically suffer from significant artifacts. An example of a DIC microscope that uses polarization in its phase-imaging strategy can be found in B. C. Albensi, E. V. Ilkanich, G. Dini, and D. Janigro, "Elements of Scientific Visualization in Basic Neuroscience Research," BioScience 54, 1127-1137 (2004), which is hereby incorporated by reference in its entirety for all purposes. Since polarized light must be used, these devices generate images of birefringent objects (e.g., potato starch storage granules) that typically suffer from significant artifacts. Furthermore, these techniques use elaborate and bulky optical arrangements that are expensive and require high maintenance. The relatively high cost of these systems prevents their broader use.

In recent years, other phase microscopy techniques have been developed such as 1) phase shifting interferometry schemes—where two or more interferograms with different phase shifts are acquired sequentially and a phase image is generated therefrom, 2) digital holography or Hilbert phase microscopy—where high frequency spatial fringes encoded on the interferogram are demodulated to generate the phase image, 3) swept-source phase microscopy—where modulation in the interferogram generated by a wavelength sweep can be processed to create a phase image, 4) Polarization quadrature microscopy—where phase images are generated by a polarization based quadrature interferometer, and 5) harmonically matched grating-based phase microscopy—which makes use of non-trivial phase shifts between the different diffraction orders from a harmonic combination grating to generate phase images. Examples of these phase microscopy techniques can be found in K. Creath, "Phase-measurement interferometry techniques," Prog. Opt. 26, 44 (1988), K. J. Chalut, W. J. Brown, and A. Wax, "Quantitative phase microscopy with asynchronous digital holography," Optics Express 15, 3047-3052 (2007), P. Marquet, B. Rappaz, P. J. Magistretti, E. Cuche, Y. Emery, T. Colomb, and C. Depeursinge, "Digital holographic microscopy: a noninvasive contrast imaging technique allowing quantitative visualization of living cells with subwavelength axial accuracy," Optics Letters 30, 468-470 (2005), B. Rappaz, P. Marquet, E. Cuche, Y. Emery, C. Depeursinge, and P. J. Magistretti, "Measurement of the integral refractive index and dynamic cell morphometry of living cells with digital holographic microscopy," Optics Express 13, 9361-9373 (2005), T. Ikeda, G. Popescu, R. R. Dasari, and M. S. Feld, "Hilbert phase microscopy for investigating fast dynamics in transparent systems," Optics Letters 30, 1165-1167 (2005), G. Popescu, T. Ikeda, K. Goda, C. A. Best-Popescu, M. Laposata, S. Manley, R. R. Dasari, K. Badizadegan, and M. S. Feld, "Optical measurement of cell membrane tension," Physical Review Letters 97 (2006), M. V. Sarunic, S. Weinberg, and J. A. Izatt, "Full-field swept-source phase microscopy," Optics Letters 31, 1462-1464 (2006), D. O. Hogenboom, C. A. DiMarzio, T. J. Gaudette, A. J. Devaney, and S. C. Lindberg, "Three-dimensional images generated by quadrature interferometry," Optics Letters 23, 783-785 (1998), Z. Yaqoob, J. G. Wu, X. Q. Cui, X. Heng, and C. H. Yang, "Harmonically-related diffraction gratings-based interferometer for quadrature phase measurements," Optics Express 14, 8127-8137 (2006), and W. Choi, C. Fang-Yen, K. Badizadegan, S. Oh, N. Lue, R. R. Dasari, and M. S. Feld, "Tomographic phase microscopy," Nature Methods 4, 717-719 (2007), which are hereby incorporated by reference in their entirety for all purposes. However, as with phase contrast and conventional DIC microscopy, these advanced methods contain significant optical elements and have relatively steep learning curves. In addition, these phase microscopy techniques invariably require the use of a laser source to provide coherent light.

Another technique for calculating optical phase includes collecting two or three successive images of the specimen around its focal plane. An example of this technique can be found in A. Barty, K. A. Nugent, D. Paganin, and A. Roberts, "Quantitative optical phase microscopy," Optics Letters 23, 817-819 (1998), which is hereby incorporated by reference in its entirety for all purposes. This technique however, requires the physical actuation of the camera to be placed in three distinct positions in order to provide enough data to render a single phase image, and is therefore intrinsically limited in speed. In addition, the presence of a mechanical actuation system can also introduce undesirable vibrations to the microscope and potentially pose a challenge to sensitive experiments.

BRIEF SUMMARY OF THE INVENTION

Embodiments of the present invention relate to a wavefront imaging device (WIS) that measures amplitude and/or phase variations of an image wavefront induced by the presence of an object and generate images of the object. The WIS has an aperture layer having one or more apertures and a light detector. A transparent layer separates the light detector and the aperture layer. In operation, an objection in the light field can induce an image wavefront. The light detector at the back of the WIS receives the distribution of light through the aperture or apertures in the form of a light projection or light projections. The light detector is placed at a self-focusing plane in the high Fresnel number regime to narrow the light projections. The light detector measures the lateral movement of the narrowed light projection(s) and determines the phase gradient from this movement. The WIS can also sum up the intensity over each light projection to determine the amplitude or total intensity at each aperture. The WIS can then numerically generate one or more images from the amplitude and/or phase gradient information.

One embodiment is directed to a wavefront imaging sensor comprising an aperture layer having an aperture, a light detector having a surface and a transparent layer between the aperture layer and the light detector. The light detector is configured to receive a light projection at the surface of the light detector. The light projection is from light passing through the aperture. The light detector is further configured to separately measure amplitude and phase information of a wavefront based on the received light projection. The transparent layer has a thickness designed to locate the surface of the light detector approximately at a self-focusing plane in a high Fresnel number regime to narrow the light projection.

Another embodiment is directed to a wavefront imaging sensor comprising an aperture layer having an array of apertures, a light detector having a surface and a transparent layer between the aperture layer and the light detector. The light detector is configured to receive one or more light projections at the surface from light passing through the array of apertures. The light detector is further configured to separately measure amplitude and phase information of a wavefront based on the received one or more light projections. The transparent layer has a thickness designed to locate the surface of the light detector approximately at a self-focusing plane in a high Fresnel number regime to narrow the one or more light projections.

Another embodiment is directed to a method for separately measuring the amplitude and phase gradient of a wavefront using a wavefront imaging sensor having an aperture layer, a light detector and a transparent layer between the aperture layer and the light detector. The method includes receiving a light projection at a surface of the light detector. The light projection is from light passing through an aperture of the aperture layer. The surface is located approximately at a self-focusing plane in a high Fresnel number regime to narrow the light projection. The method also estimates a lateral shift of the light projection by estimating a center of the light projection on the surface. Then, the method measures the phase gradient of the wavefront at the aperture using the estimated lateral shift of the light projection and measures the amplitude of the wavefront at the aperture by summing up intensity signals received by the light detecting elements assigned to the aperture.

These and other embodiments of the invention are described in further detail below.

DETAILED DESCRIPTION OF THE INVENTION

Figure 1A:
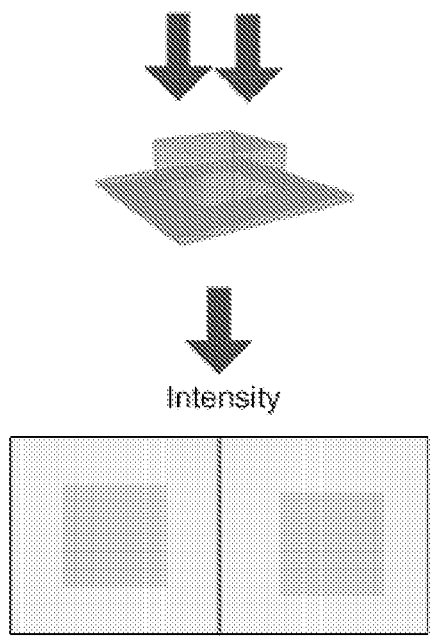
FIG. 1(a) is a schematic illustration of the underlying principle of a conventional DIC device.
Figure 1B:
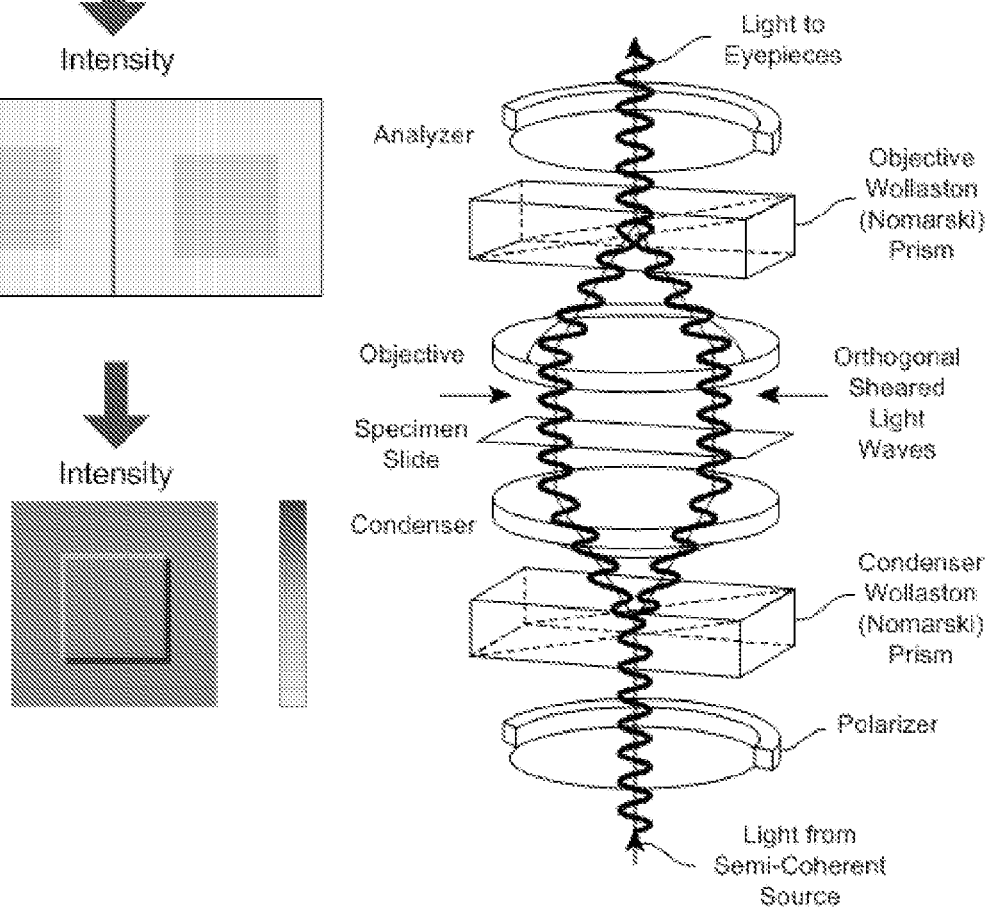
FIG. 1(b) is a schematic drawing of a conventional DIC device.

Embodiments of the present invention will be described below with reference to the accompanying drawings. Some embodiments include a WIS (wavefront imaging sensor) configured to measure the amplitude and/or phase variations of an image wavefront. The WIS has an aperture layer with one or more closely spaced apertures and a light detector receiving light through the aperture(s) in the form of light projection(s). The WIS also includes a transparent layer between the light detector and the aperture layer. The thickness of the transparent layer can be sized to locate the light detector at a self-focusing plane in the high Fresnel region to narrow the light projection(s). During operation, the light detector at the back of the WIS receives the light projection(s) and can measure the lateral movement of the narrowed light projection(s) due to a phase gradient of the image wavefront. The WIS can determine the phase gradient based on the lateral movement. The WIS can also sum up the intensity over each light projection to determine the amplitude or total intensity at each aperture. The WIS can generate one or more images of the object based on the measured amplitude and/or phase gradient information.

Some embodiments include a WIS that can be used in applications such as microscopy, photography, or other imaging devices. For example, an embodiment of a WIS can be used in place of a conventional camera in a standard bright-field microscope. The WIS can transform the bright-field microscope into a wavefront microscope that can provide both bright-field (transmitted light intensity) and phase gradient images. Since the WIS of some embodiments can detect light intensity/amplitude variations in addition to the phase variations, the WIS of these embodiments can replace sensors in digital cameras. Some other examples of applications that may benefit from the use the phase gradient measuring capability of the WIS include machine recognition, object ranging, and texture assessment. In addition, fields such as LASIK surgery and high-resolution retinal imaging can also benefit from the phase gradient measuring capability of the WIS.

The WIS of many embodiments provides advantages because the WIS can self focus the light in the high Fresnel number regime which narrows the light projections received by the light detector without the need of lenses. First, this self-focusing scheme is advantageous over conventional wavefront sensors such as Shack-Hartmann sensors which use microlenses to narrow light projections. By avoiding the need for lenses, the cost for WIS devices can be reduced. Also, since the light projections through the apertures are narrowed, the apertures can be arranged in a more dense fashion, which can provide more highly populated light data and improved sensor sensitivity. Further, the narrowing of light projections avoids crosstalk or interference between neighboring projections, which can also improve image quality.

Another advantage of the WIS of some embodiments is that it can implement phase gradient measuring functionality onto a simple sensor chip such as a CMOS (complementary metal-oxide-semiconductor) chip. In some cases, the different layers of the WIS can be formed as part of the sensor chip fabrication process, which minimizes the cost. This implementation is advantageous over conventional phase sensing devices that use bulky optical elements to provide similar functionality. Since there are no bulky optical elements, the WIS can be more robust (less optical elements to break), less expensive, and simpler in use and design than conventional phase sensing devices.

An imaging device employing a WIS of embodiments of the invention also provides advantages because it will not require polarized light as part of its imaging technique. Since the imaging device will does not depend on the polarization of the light (illumination), the imaging device can use unpolarized light to generate artifact-free phase gradient and intensity images for both birefringent and homogenous objects. Also, an ordinary illumination source can be used such as the illumination source used in a conventional microscope.

I. WIS (Wavefront Imaging Sensor)

Figures 2A, 2B:
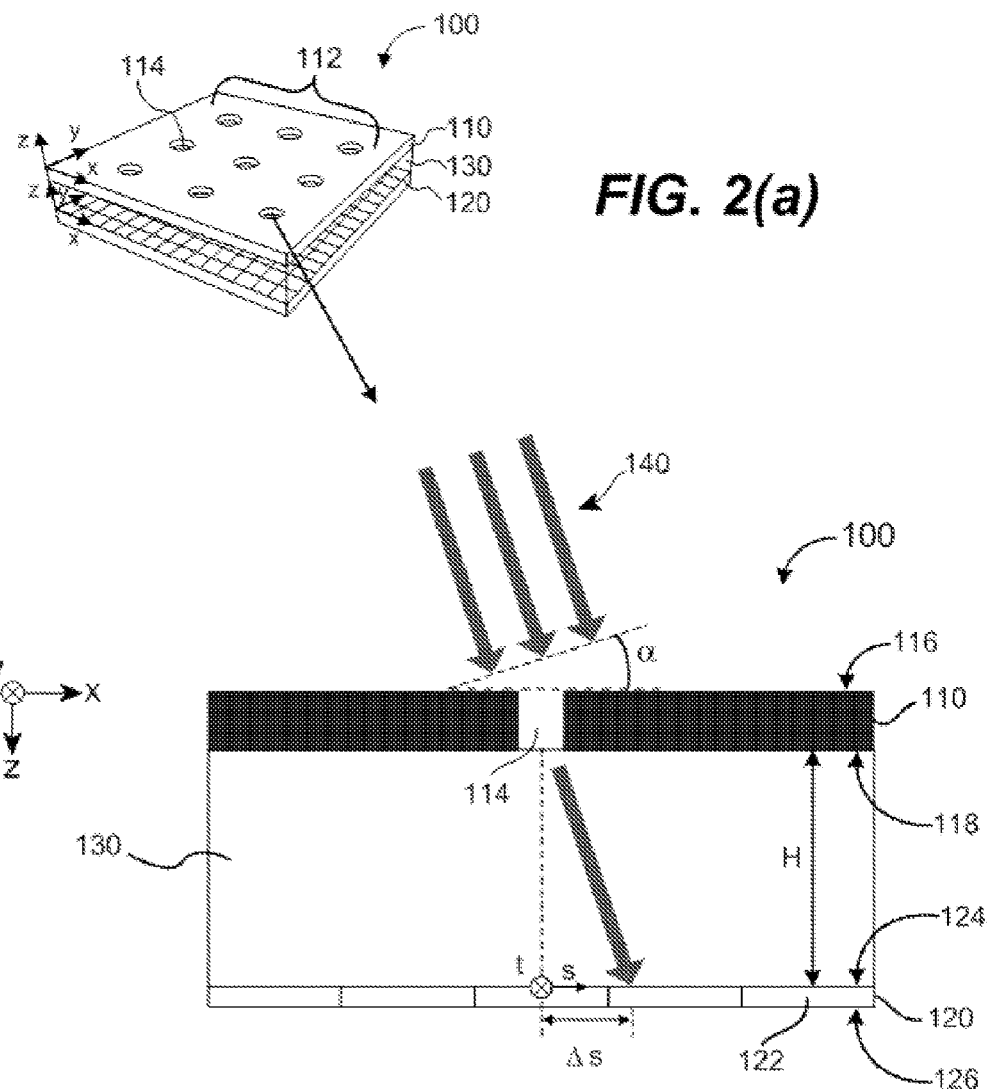
FIG. 2(a) is schematic drawing of a perspective view of components of a WIS, according to an embodiment of the invention.
FIG. 2(b) is schematic drawing of a cross sectional of the WIS of FIG. 2(a) through an aperture, according to an embodiment of the invention.

FIG. 2(a) is schematic drawing of a perspective view of components of a WIS 100, according to an embodiment of the invention. In the illustrated example, the WIS 100 comprises an aperture layer 110, a light detector 120 and a transparent layer 130 between the aperture layer 110 and the light detector 120. The aperture layer 110 has one or more apertures 114 in the form of a two-dimensional array 112 of apertures 114. In this embodiment, the two-dimensional array 112 has the dimensions of 3×3. Other embodiments can have any suitable dimensions. Although the apertures 112 are shown to be a two-dimensional array in many embodiments, the apertures 112 may be in the form of a one-dimensional array of apertures 114, a multitude of one-dimensional and/or two-dimensional array of apertures, or other suitable arrangement of apertures in other embodiments.

FIG. 2(b) is schematic drawing of a cross section of the WIS 100 of FIG. 2(a) through an aperture 114 showing some of the details of the WIS 100, according to an embodiment of the invention. In FIG. 2(b), the WIS 100 comprises an aperture layer 110 having an aperture 114, a light detector 120 and a transparent layer 130 between the aperture layer 110 and the light detector 120. The aperture layer 110 includes a first surface 116 and a second surface 118. The light detector 120 (e.g., CMOS, charge-coupled device (CCD), etc.) includes a plurality of light detecting elements 122, a first surface 124 and a second surface 126. In FIGS. 2(a) and 2(b), the plurality of light detecting elements 122 includes a 5×5 grid of light detecting elements 122 corresponding (assigned) to each aperture 114. The transparent layer 130 has a thickness "H" between the second surface 118 of the aperture layer 110 and the surface 124 of light detector 120.

In FIG. 2(b), a modulated light wave 140 (e.g. an image wavefront) impinges the aperture layer 110 at an incident angle $\alpha$. The light transmission through the aperture 114 forms a light projection (not shown) on the light detector 120. The center of the light projection shifts $\Delta s$ based on the incident angle $\alpha$.

A WIS 100 of some embodiments can refer to a multi-layer structure. The WIS 100 includes an opaque or semi-opaque aperture layer 110 with one or more apertures 114 in it. The opaque or semi-opaque aperture layer 110 can be a thin metallic layer in some cases. The WIS 100 may optionally include a transparent protective layer (not shown) that covers the opaque or semi-opaque aperture layer 110 to isolate the opaque or semi-opaque aperture layer 110. The aperture layer 110 can have any suitable thickness.

An aperture 114 can refer to a light transmissive region in the aperture layer 110. In many embodiments, the aperture 114 is a hole, which can be a void or filled with a transparent material. The aperture 114 can have any suitable cross-sectional shape (e.g., a circle, rectangle, triangle, oval, etc.) and any suitable size "d" (e.g., 1 micron, 3 microns, 6 microns, etc.). In one exemplary embodiment, an aperture 114 is a circular hole having a diameter of 6 microns.

Many embodiments of the WIS 100 include one or more apertures 114 in the form of a two-dimensional array of apertures 112. In other embodiments, the apertures 114 can be in other suitable arrangements such as a one-dimensional array, or a multitude of one-dimensional arrays and/or two-dimensional arrays. The array of apertures can have any suitable dimension such as 500×500, 1000×500, 1×1, 10×10, etc.

The apertures 114 in an aperture layer 110 can have any suitable spacing between adjacent apertures 114. In one embodiment, the aperture layer 110 may have closely spaced apertures having any suitable close aperture spacing. Some examples of suitable close aperture spacing include 1 micron, 5 microns, and 10 microns, etc., where the aperture size is 5 microns. In one exemplary embodiment, a close aperture spacing is 11 microns. In some cases, a WIS 100 having an aperture layer 110 with close aperture spacing may collect densely populated light data at the light detector 120.

The transparent layer 130 between the light detector 120 and the aperture layer 110 can include one or more layers of transparent or semi-transparent material such as water or a viscous polymer (e.g., SU-8 resin), or can be a vacuum or gas-filled space. The transparent layer 130 can have any suitable thickness H. In some cases, the transparent layer 130 is sized to have a predetermined thickness H which locates the light detector 120 at a self-focusing plane.

A light detector 120 (e.g., photosensor) can refer to any suitable device capable of detecting light and generating signals with data about the amplitude, intensity, and phase gradient of the impinging light in x and y directions, and/or other information about the light being detected. The signals may be in the form of electrical current that results from the photoelectric effect. Some examples of suitable light detectors 120 include a charge coupled device (CCD) or a linear or two-dimensional array of photodiodes (e.g., avalanche photodiodes (APDs)). A light detector 120 could also be a complementary metal-oxide-semiconductor (CMOS) or photomultiplier tubes (PMTs). Other suitable light detectors 120 are commercially available. Some examples of suitable light detectors are described in Section IB.

The light detector 120 comprises one or more light detecting elements 122 (e.g., sensor pixels). The light detecting elements 122 can be of any suitable size (e.g., 1-4 microns) and any suitable shape (e.g., circular or square). The light detecting elements 122 can be arranged in any suitable form. Some examples of suitable forms include a one-dimensional array, a two-dimensional array and a multitude of one-dimensional and/or two-dimensional arrays. In some cases, the light detecting elements 232 can be arranged in the similar form to the apertures 112 and map to the apertures 114.

In many embodiments, one or more of the plurality of light detecting elements 122 is assigned (corresponds) to a specific aperture 114 and measures the light projection associated with the specific aperture 114. Any suitable number of light detecting elements 122 can be used to correspond to a single aperture 114. In one embodiment, a two-dimensional array of light detecting elements 122 having a dimension of MN×MN corresponds to a two-dimensional array of aperture 114 having a dimension of M×M. In this embodiment, a portion of the MN×MN array consisting of a two-dimensional array of N×N light detecting elements 122 corresponds to each aperture 114. For example, a two-dimensional 15×15 (N=5, M=3) array of light detecting elements 122 can correspond to a two-dimensional 3×3 (M=3) array of apertures 114. In this example, a two-dimensional 5×5 (N=5) array of light detecting elements 122 corresponds to each aperture 114 and measures the light projection associated with that aperture 114. An imaging device employing the WIS 100 of this example can effectively generate a light field image having an M×M pixel image resolution.

Figure 3A:
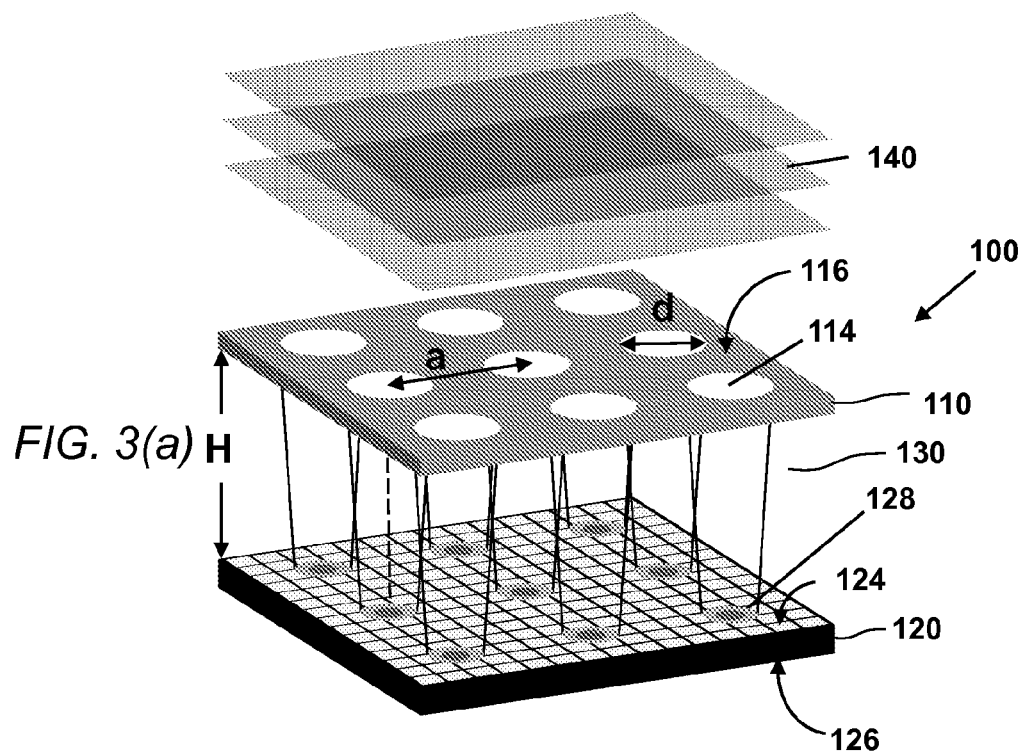
FIGS. 3(a) and 3(b) are schematic drawings of a perspective view of components of a WIS, according to embodiments of the invention.
Figure 3B:
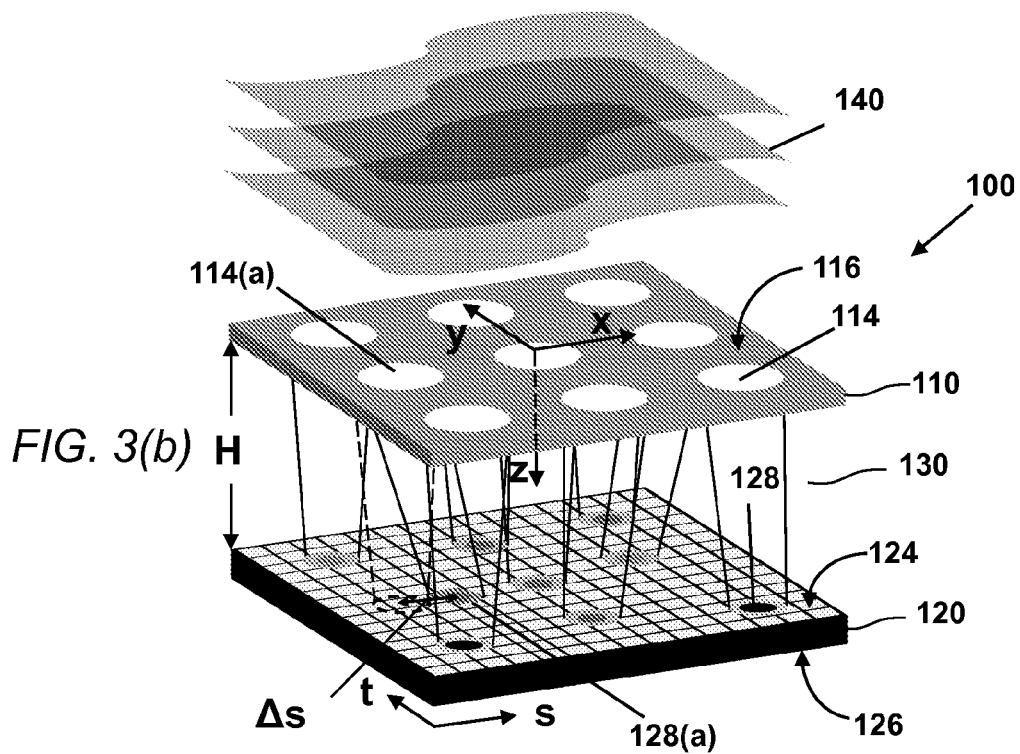

FIGS. 3(*a*) and 3(*b*) are schematic drawings of a perspective view of components of a WIS 100, according to embodiments of the invention. In FIGS. 3(*a*) and 3(*b*), the WIS 100 comprises an aperture layer 110, a light detector 120 and a transparent layer 130 between the light detector 120 and the aperture layer 110. The aperture layer 110 has a one or more apertures 114 in the form of a 3×3 two-dimensional array of apertures 112. The apertures 114 are holes having a dimension d and an aperture spacing a. The transparent layer 110 has a thickness H. The light detector 120 comprises a plurality of light detecting elements 122 in the form of a 15×15 two-dimensional array. In FIGS. 3(*a*) and 3(*b*), a 5×5 two-dimensional array of light detecting elements 122 corresponds to each of the apertures 114. The WIS 100 also comprises an x-axis, y-axis, and a z-axis at the surface 116 of the aperture layer 110. The WIS 100 also includes an s-axis and a t-axis at the surface 126 of the light detector 120. In FIG. 3(*a*), the WIS 100 also includes an illumination source 150 providing light to the aperture layer 110.

An illumination source 150 can refer to any suitable device or other source of light. The light provided by illumination source 150 can be of any suitable wavelength and intensity. Also, the light can include polarized and/or unpolarized light. In embodiments where unpolarized light is used, the WIS 100 can detect light data that can be used to generate artifact-free images of birefringence specimens. Suitable illumination sources 150 are naturally and commercially available. In some embodiments, the illumination source 150 can be a component of the WIS 100. In other embodiments, the illumination source 150 can be a separate component from the WIS 100. In one embodiment, the illumination source 150 is a broadband halogen lamp.

An illumination source 150 can be placed in any suitable location and positioned in any suitable incident angle α to provide appropriate light to the WIS 100. In some embodiments, multiple illumination sources 150 may provide light in one or more directions. For example, a camera system employing a WIS 100 of an embodiment can have a first illumination source 150 that provides light in a first direction such as from a flash and a second illumination source 150 that provides light in a second direction. The first direction can be different from second direction, similar to the second direction, or the same as the second direction. In other embodiments, a single illumination source 150 provides light in a single direction. For example, a microscope system comprising a WIS 100 may have a single illumination source 150 positioned to provide light in the negative z-direction.

FIGS. 3(*a*) and 3(*b*) also demonstrate the operating principle of the WIS 100. As shown in FIG. 3(*a*), when a light wave 140 is incident upon the aperture layer 110, the transmission through the aperture 114 forms a light projection 128 on the light detecting elements 122 (e.g., sensor pixels) of the light detector 120. A light projection 128 can refer to the light data received from light passing through a particular aperture at a specific plane parallel to the surface 118 of the aperture layer 110. In many cases, the light projection is received at the surface 124 of the light detector 120, which may or may not be coincident to a self-focusing plane (not shown). The light projection 128 in some illustrated embodiments is shown as a spot on the light detector 120.

As shown in FIGS. 3(*a*) and 3(*b*), when a light wave 140 is incident upon the aperture layer 110, light passing through a particular aperture 114 generates a spot (light projection) 128 on the light detecting elements 122 (e.g., sensor pixels) associated with that aperture 114. Lines have been drawn to show approximate locations of the light projections 128 on the associated light detecting elements 122.

If a light wave 140 impinging an aperture layer 110 at aperture 114 has little to no phase gradient, the light projection 128 is approximately centered about a centerline of the aperture 114. In some cases, a plane light wave 140 can be based on a uniform light field from an illumination source 150. If the light wave 140 impinging the aperture layer 110 at an aperture 114 has a non-zero phase gradient at an aperture 114, the light projection 128 laterally shifts according to the normalized phase gradient of the modulated light wave 140 at that aperture 114. Due to the non-zero phase gradient, the light projection 128 laterally shifts in the s and/or t directions. In some cases, the modulated light wave 140 may be due to, for example, the introduction of an object into a uniform light field provided by an illumination source 150.

In FIG. 3(*a*), the light wave 140 impinging the aperture layer 110 at aperture 114 has a zero phase gradient. In this illustrated example, the light projections 128 received at the light detector 120 are approximately centered about a centerline of the apertures 114. In FIG. 3(*b*), a modulated light wave 140 (e.g., an image wavefront) having a non-zero phase gradient at aperture 114(*a*) impinges upon the aperture layer 110. In response, the light projection 128(*a*) has laterally shifted by Δs in the s direction according to the normalized phase gradient of the modulated light wave 140 at that aperture 114(*a*).

Mathematically, the lateral shifts (Δs and Δt) of each light projection 128 on the light detector 120 are related to the wavelength-normalized phase gradients ($\theta_x$ and $\theta_y$) of the light wave 140 at the corresponding aperture 114 at (x, y), to the thickness H of the transparent layer 130, and to the refractive index n of the transparent layer 130, as:

$$\Delta s(x, y) \approx H \frac{\theta_x(x, y)}{n} = \frac{H\lambda}{2\pi n} \frac{\partial \phi(x, y)}{\partial x} \quad (1)$$

$$\Delta t(x, y) \approx H \frac{\theta_y(x, y)}{n} = \frac{H\lambda}{2\pi n} \frac{\partial \phi(x, y)}{\partial y} \quad (2)$$

when $\Delta s(x, y) \ll H$, where $\theta_x(x, y)$ is the normalized phase gradient of the light wave along x-direction over an aperture 114 at (x, y), $\lambda$ is the wavelength of the light field provided by an illumination source 150 (not shown), n is the refractive index of the material of the transparent layer 130, and $$\frac{\partial \phi(x, y)}{\partial x}$$

is the phase gradient along x-direction over aperture 114 at (x, y).

Using Eqns. (1) and (2), the WIS 100 can determine the normalized phase gradients $\theta_x$ and $\theta_y$ based on the measured shifts $\Delta s$ and $\Delta t$ in the light projections 128. As shown in Eqns. 1 and 2, the normalized phase gradients $\theta_x$ and $\theta_y$ can be a wavelength-independent measure of the directionality of the incoming light field.

The WIS 100 can also determine the amplitude of the light wave 140 at each of the apertures 114. The light detector 120 of the WIS 100 measures the intensity distribution of the light projections 128 corresponding to each of the apertures 114. The WIS 100 can then sum the intensity values over the light projections 128 to determine the intensity/amplitude at each aperture (x, y).

A. High Fresnel Number Design

The WIS 100 of many embodiments of the invention is designed to operate in a high Fresnel number regime. This high Fresnel number design intrinsically focuses (narrows) the light through the aperture 114 so that the light projection 128 received by the light detector 120 is narrower than the size of the aperture 114 without the need of lenses. Since the light projection 128 is narrowed by this intrinsic focusing mechanism, there can be less space between adjacent apertures without causing crosstalk. With less space needed between the apertures, the aperture layer 110 can be more densely populated which can improve sensitivity. In some cases, the high Fresnel number designed WIS 100 can have apertures 114 with a close aperture spacing (e.g., 11 microns) relative to the aperture size (e.g., 6 microns), which can improve sensor sensitivity. In one embodiment, a high Fresnel number designed WIS 100 can provide a normalized phase gradient sensitivity of 0.1 mrad under the typical working condition –1.0 second total signal accumulation time and 9.2 µW/cm² light intensity on the sensor. An imaging device employing this highly sensitive WIS 100 can provide an improved quality image over conventional phase imaging devices.

A Fresnel number refers to a dimensionless number that is associated with the level of diffraction of the light passing through an aperture. The Fresnel number can be expressed as:

$$F = \frac{nd^2}{4H\lambda} \quad (3)$$

where d is the aperture size, H is the thickness of the transparent layer, n is the refractive index of the transparent layer 130 and $\lambda$ is the incident wavelength. In some embodiments, a high Fresnel number is a Fresnel number $\gg 1$ and a low Fresnel number is a Fresnel number $\ll 1$. In other embodiments, a high Fresnel number is a Fresnel number greater than 0.80 and a low Fresnel number is a Fresnel number less than 0.80. In one exemplary embodiment, a Fresnel number close to 1.0 (e.g., 0.80, 0.86, 0.90, etc.) is a high Fresnel number.

In some embodiments, a high Fresnel number can be associated with Fresnel diffraction where the light through the aperture 114 is focused and a low Fresnel number can be associated with far-field diffraction where the light through the aperture 114 spreads. A light detector 120 located in the high Fresnel number regime of these embodiments, receives a light projection 128 that is narrowed relative to the aperture 114. The light projection 128 can be narrowed by any suitable percentage. Some examples of suitable narrowing percentages include 20%, 25%, 30%, 35, etc. A light detector 120 located in the low Fresnel regime of these embodiments, receives a light projection 128 that is widened relative to the aperture 114.

In many embodiments, the WIS 100 is designed to operate in the high Fresnel number regime by locating the light detector 120 approximately at a self-focusing plane 160. In some cases, the transparent layer 130 is designed with a predetermined thickness H which locates the light detector 120 at the self-focusing plane 160. A self-focusing plane 160 can refer to a plane where the light projection 128 has shrunk to a minimum size and/or is associated with a maximum Fresnel number. In some embodiments, the self-focusing plane 160 is a plane parallel to the surface 118 of the aperture layer 110. In one embodiment, the self-focusing plane 160 is located in close proximity (e.g., 18 micron for an aperture of 6 micron in diameter illuminated by a light of 600 nm in wavelength) to the aperture layer 110.

In one embodiment, a WIS 100 can be designed to operate in a high Fresnel number regime by having a predetermined thickness of the transparent layer 130=28 microns, the aperture size d=6 microns, the $\lambda$=0.6 microns, and n=1.6. In this embodiment, the WIS 100 operates in a high Fresnel number regime where the Fresnel number $$F = \frac{nd^2}{4H\lambda} = \frac{1.6 \times (6 \ \mu m)^2}{4 \times 28 \ \mu m \times 0.6 \ \mu m} = 0.86.$$

Since the WIS 100 is operating in a high Fresnel number regime, the light projections 128 are tightly confined on the light detector 120. In other words, light transmitted through an aperture 114 of this embodiment self-focuses and is detected by the light detector 120 before spreading. The WIS 100 is designed such that the light detector 120 is approximately located at the self-focusing plane 160 where self-focusing to a minimum light projection occurs. This design can include close aperture spacing such as 11 microns. Additionally, the lateral shifts of the light projections 128 are responsive to the phase front gradients of the incident light fields. For these reasons, the designed WIS 100 is a simple-to-implement, highly compact, high density (e.g., 11 um spacing between apertures), high image pixel count (280×350 image pixels over a sensor area of 3.08 mm×3.85 mm) and highly sensitive WIS 100. By monitoring the tightly confined light projections 128 in a high Fresnel regime, the WIS 100 of some embodiments can measure both the intensity and phase gradient variations. In one embodiment, a WIS 100 can measure normalized phase gradient sensitivity of 0.1 mrad with 1.0 second total signal accumulation time and 9.2 µW/cm2 light intensity.

Figure 4:
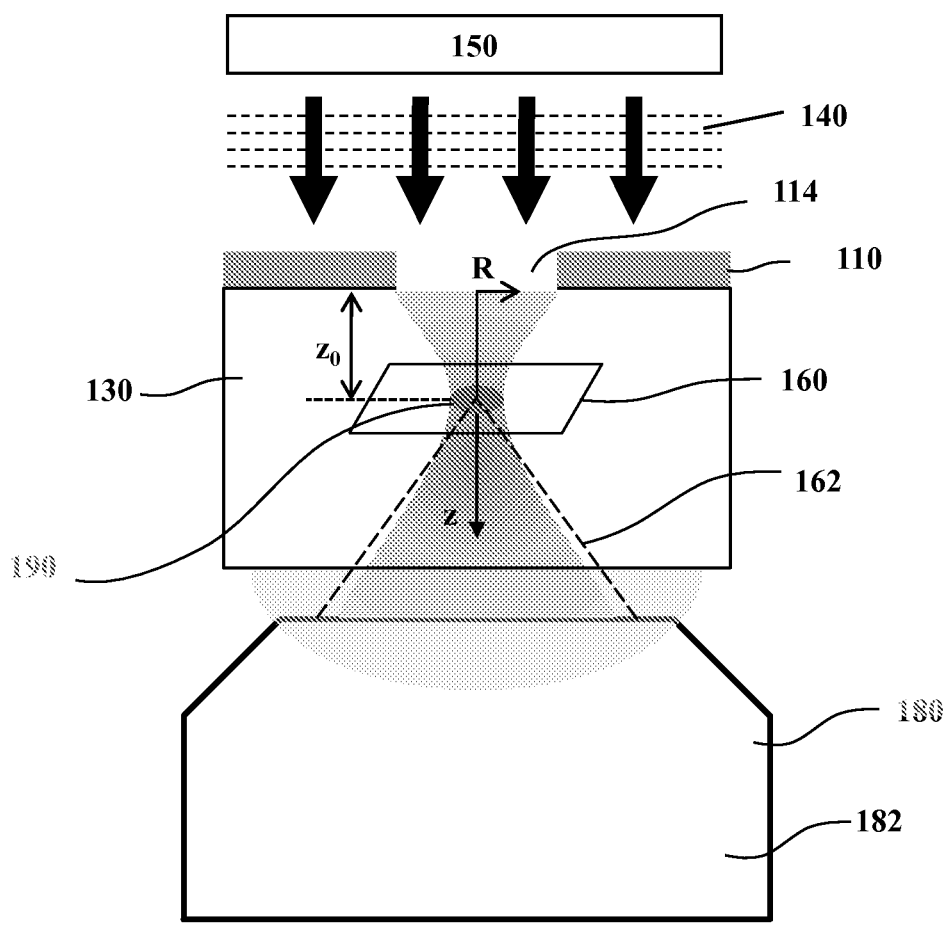
FIG. 4 is a schematic drawing of a side view of a WIS system having components of a WIS and components of a microscope for imaging the light projected through the apertures and light projections at different axial displacements, according to an embodiment of the invention.

FIG. 4 is a schematic drawing of a side view of a WIS system 200 having components of a WIS 100 and components of a microscope 180 for imaging the light projected through the apertures and light projections 128 at different axial displacements, according to an embodiment of the invention. The illustrated components of the WIS 100 include an aperture layer 110 having an aperture 114 and a transparent layer 130 (e.g., a glass layer) adjacent to the aperture layer 110. An illumination source 150 is shown providing a uniform light wave 140 to the aperture layer 110. The microscope 180 includes a lens 182 (e.g. an oil immersion 100× objective lens with N.A.=1.3) to image the light passing through the aperture 114 and the light projections 128 at different axial displacements along a z-axis. The images of the light projections 128 at different axial displacements along the z-axis can be used to determine the radius R of the light projections 128.

In FIG. 4, the light passing through the aperture 114 is shown to narrow to a tightly confined radius R in a region in close proximity to the aperture layer 110 in a high Fresnel number regime. Away from this region, the radius R expands due to far field diffraction 162 in an approximately linear fashion away from the aperture layer 110 in a low Fresnel number regime. The WIS system 200 also includes a self focusing plane 160 at a distance $z_0$ along the z-axis from the aperture layer 110. At the self-focusing plane 160, the light has narrowed to a minimum radius. A minimum radius light projection 190 at the self-focusing plane 160 has a minimum radius $R_{min}$ and/or is associated with a maximum Fresnel number for the WIS system 200.

In one embodiment, the WIS system 200 can be used to determine the distance $z_0$ from the aperture layer 110 to the self-focusing plane 160. The WIS system 200 determines image of the light projections 128 along the z-axis and determines the minimum light projection 190 having the smallest (minimum) radius $R_{min}$. The WIS system 200 can then determine the distance $z_0$ that corresponds to the minimum light projection 190.

In some embodiments, the WIS system 200 can operate to determine the approximate location of the self-focusing plane 160 for a given aperture size d, transparent layer refractive index n and aperture layer thickness. A WIS 100 can then be designed based on this determined location of the self-focusing plane 160 to operate in a high Fresnel number regime. The WIS 100 can be designed with a transparent layer 130 having a predetermined thickness equal to the distance $z_0$ that corresponds to the minimum radius light projection 190 so that the light detector 120 is approximately located at the self-focusing plane 160 and the WIS 100 can operate in the high Fresnel number regime. For example, the WIS system 200 can determine the images of the light projections 128 along the z-axis. The WIS system 200 then measures the radius of each of the light projections. The WIS system 200 then determines the minimum radius light projection 190 having a minimum radius $R_{min}$ and the distance $z_0$ along the z-axis of the light projection having minimum radius $R_{min}$. The WIS 100 can then be designed so that the transparent layer 130 has a predetermined thickness of $z_0$ so that the light detector 120 is located at the self-focusing plane 160.

Figures 5A, 5B:
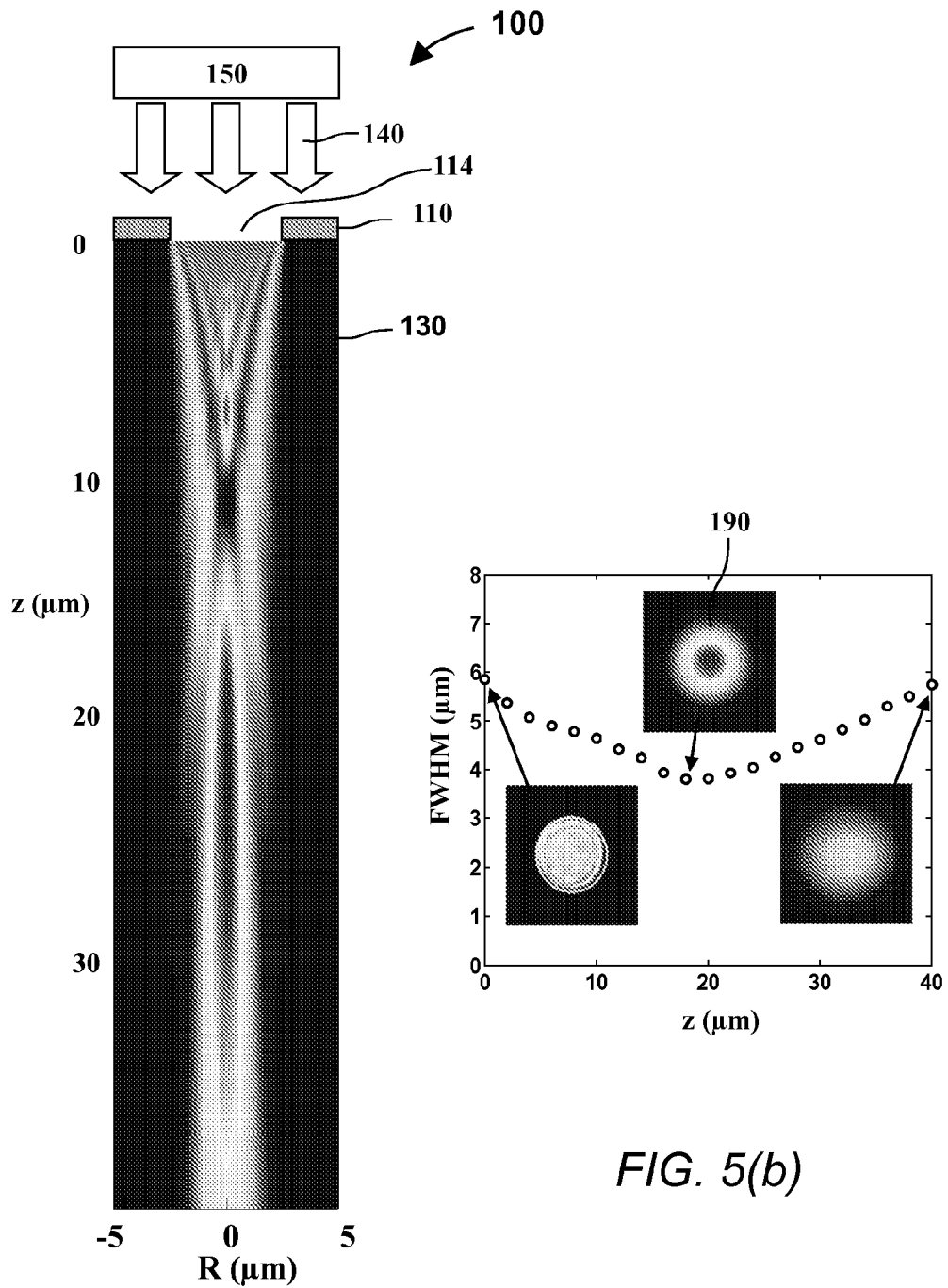
FIG. 5(a) is a computer simulated illustration showing a side view of components of a WIS, according to an embodiment of the invention.
FIG. 5(b) is a graph of the size of the images of light projections at different distances from the aperture layer, according to an embodiment of the invention.

FIG. 5(a) is a computer simulated illustration showing a side view of components of a WIS 100, according to an embodiment of the invention. The illustrated components of the WIS 100 include an aperture layer 110 having an aperture 114 and a transparent layer 130 adjacent to the aperture layer 110. An illumination source 150 is shown providing a uniform light wave 140 to the aperture layer 110. In the illustrated example, a simulated image of the light projected through the aperture 114 is shown. In addition, the radius R of the light projection image is illustrated as a measure of the distance z from the aperture layer 110. As shown, the radius R of the light projection narrows to a tightly confined radius in a region in close proximity to the aperture layer 110 in a high Fresnel number regime. The radius R expands due to far field diffraction away from that region.

FIG. 5(b) is a graph of the size of the images of light projections 128 at different distances from the aperture layer 110, according to an embodiment of the invention. In this illustrated example, the WIS 100 has a transparent layer thickness H=18 microns and an aperture size d=6 microns. In other embodiments, the WIS 100 can have any suitable transparent layer thickness and aperture size. The graph compares the size of the light projections 128 in terms of a full width at half maximum (FWHM) versus the distance z (microns) from the aperture layer 110. In some cases, the WIS system 200 of FIG. 4 can be used to determine the images in FIG. 5(b) and the size of the light projections 128 at different distances z from the aperture layer 110.

As shown in the illustrated graph, an aperture 114 having a 6 micron diameter is associated with a minimum radius projection 190 having a 3.8 micron FWHM (full width at half maximum—FWHM) where the transparent layer has a thickness H=18 microns above the light detector 120. In the illustrated example, the minimum radius projection 190 is 37% smaller than the aperture diameter itself. In addition, the graph shows that the aperture 114 is associated with a light projection having a FWHM of less than 5 microns for H values ranging between 4 and 34 microns. That is, a WIS 100 having a 6 microns aperture and a transparent layer 130 ranging between 4 and 34 microns can operate in the high Fresnel number regime.

Although many embodiments of the WIS 100 do not have lenses, one embodiment of the WIS 100 comprises a lens proximal to each of the light detecting elements 122 in the light detector 120. In this embodiment, each lens can help funnel light onto the light sensitive region of the light detecting elements 122 (sensor pixels). The WIS 100 of this embodiment may improve the total incident light that is transmitted through the apertures 114 in the aperture layer 110, which can improve sensor sensitivity.

B. Implementations

1. Functionalized Sensor Chips

In some embodiments, a sensor chip can been restructured to include components a WIS 100 to construct a functionalized sensor chip with the added capabilities of the WIS 100 such as the ability to measure phase gradient. The functionalized sensor chip of these embodiments can be advantageous over conventional devices that add complex and expensive optical elements to provide similar capabilities.

In some embodiments, a functionalized sensor chip includes any suitable sensor chip such as a CCD, CMOS, APD (avalanche photodiode), or other suitable device. Suitable sensor chips are commercially available. An example of a commercially available CMOS chip is the MT9P031I12STM CMOS sensor chip shown in FIGS. 6(a) and 6(b) that is manufactured by the Aptina Imaging® company. This exemplary MT9P031I12STM CMOS chip has 2,592×1,944 light detecting elements (sensor pixels) and the pixel size is 2.2 microns. The pixel fill factor is 0.8. The frame readout rate varies and is dependent on the circuit board supporting the chip. In one example, a circuit board supporting a CMOS chip with a readout-circuit can achieve 10 frames/s in a continuous mode. The cost of these exemplary CMOS chips is relatively low. In many cases, the currently commercially available CMOS chips may exceed the requirements of many conventional imaging systems. An example is of such a CMOS sensor chip is the OV9810 sensor chip manufactured by the Omnivision® company. This commercially available CMOS sensor chip has 488×2616 light detecting elements (sensor pixels) with pixels of size 1.7 microns. Another example of a suitable sensor chip that is commercially available is the Hamamatsu® S8550 APD array.

Figure 6A:
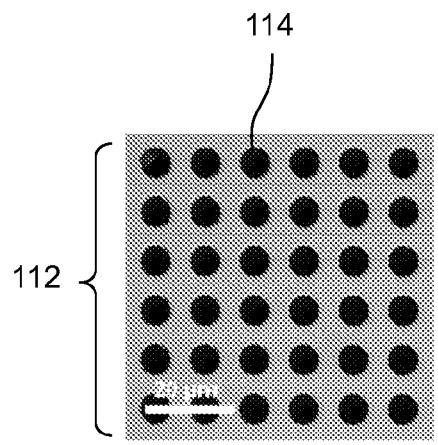
FIG. 6(a) is an image of a portion of an aperture layer having apertures in the form of a two-dimensional (6×6) array of apertures, according to an embodiment of the invention.
Figure 6B:
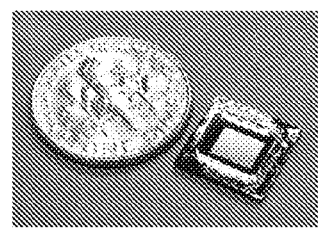
FIG. 6(b) is a photograph of a CMOS sensor chip.

Any suitable fabrication process can be used to construct a functionalized sensor chip having a WIS 100 of some embodiments. In one exemplary process, a WIS 100 is fabricated using a sensor chip (e.g., a CMOS sensor chip) as a substrate. First, a glass window is removed from the sensor chip to gain access to the surface of the sensor. Next, the surface of the sensor die is planarized with material(s) to create the transparent layer 130. In one example, the material can be a 10 microns thick layer of SU8 resin. Then, the surface of the transparent layer 130 is coated with a layer (e.g., a 150 nm thick layer of Al) to mask the sensor from light. Next, a process such as photolithography can be used to create the one or more apertures 114 (e.g., a two-dimensional array of 280×350 apertures, 6 microns aperture diameter and 11 microns aperture-to-aperture spacing) in the layer forming an aperture layer 110. FIG. 6(a) is an image of a portion of an aperture layer 110 having apertures 114 in the form of a two-dimensional (6×6) array of apertures 112, according to an embodiment of the invention.

In one embodiment, a functionalized sensor chip employing a WIS 100 is capable of simultaneously measuring both the amplitude and the phase front variations of a light field. The WIS 100 comprises a substrate light detector 120 of a sensor pixel grid (pixel size=2.2 µm), a transparent layer 130 having an effective thickness=28 µm and an aperture layer 110 of 150 nm thick aluminium. The aperture layer 110 is a two-dimensional array of closely spaced apertures (spacing=11 µm, diameter=6 µm) patterned on aperture layer 110. By monitoring the tightly confined transmitted light projections (spots) in a high Fresnel number regime, the functionalized sensor chip can accurately measure both intensity and phase front variations. In this embodiment, the functionalized sensor chip is tested to have a measured normalized phase gradient sensitivity of 0.1 mrad under the typical working condition −1.0 second total signal accumulation time and 9.2 µW/cm² light intensity on the sensor.

In one embodiment, a functionalized sensor chip with a WIS 100 can function to generate color and/or black and white images using phase and intensity variations. Any suitable implementation technique can be used. For example, a color sensor chip having stratified color sensing sites (e.g. Foveon X3® color sensor chip) can be used as a substrate in a fabrication process similar to the one described above. In another example, the WIS capable color sensors can be built with the conventional color sensors with Bayer color pixel arrangements. In this example, a light projection (spot) localization algorithms is used. The functionalized sensor chip of this embodiment can replace a camera on a conventional microscope to add the capabilities of collecting phase gradient and/or intensity images in both color and/or black and white. In previous microscope systems, the user would need to switch between different cameras to collect these images.

2. Wavefront Imaging Devices

In some embodiments, a WIS 100 can be implemented into an imaging device such as a conventional microscope or digital camera to construct a WIS system 200 that can image both bright field and phase gradient images. For example, a WIS 100 can replace a camera in a conventional bright field microscope to construct a WIS microscope system 200 having both bright field and phase gradient imaging capabilities ("Wavefront Microscope"). The phase gradient images generated by the WIS microscope system 200 can be of better quality than images from a conventional DIC microscope since they are artifact-free and quantitative. In another example, a WIS 100 can replace sensor(s) in a digital camera to construct a WIS digital camera system 200 having both bright field and phase gradient imaging capabilities ("Wavefront Camera"). The additional phase gradient sensing capability provided by the implementation of the WIS 100 can benefit various applications including, for example, machine recognition, object ranging, and texture assessment for a variety of applications.

Figure 6C:
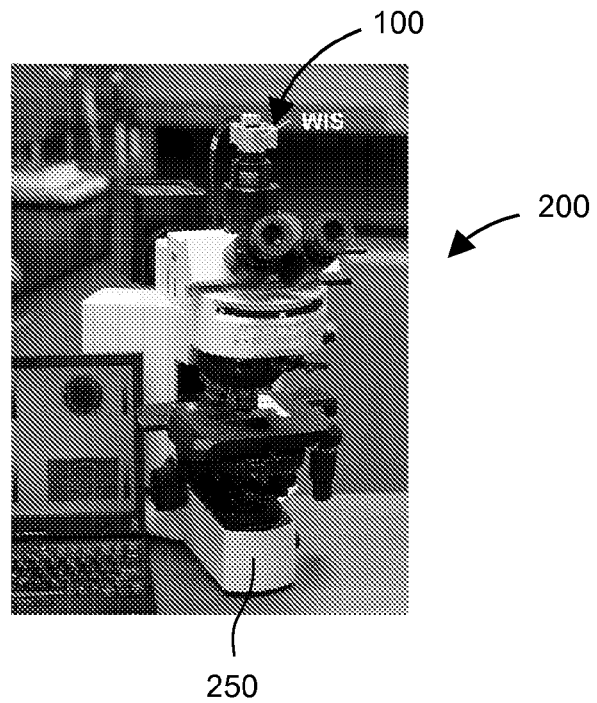
FIG. 6(c) is a photograph of a WIS system comprising a conventional microscope employing a WIS, according to an embodiment of the invention.

FIG. 6(c) is a photograph of WIS system 200 comprising a conventional microscope 250 (e.g., Olympus BX 51 microscope) employing a WIS 100, according to an embodiment of the invention. In FIG. 6(c), the WIS 100 is placed in communication with the conventional microscope 250 via its camera port. In some cases, the WIS 100 can be formed on a suitable sensor chip which is placed in communication with the camera port. In FIG. 6(c), the conventional microscope 250 includes an illumination source 150 such as a standard halogen microscope. In this example, the conventional microscope 250 also included a push-in DIC prism and polarizers, so that the conventional microscope 250 can be configured as a DIC microscope for comparison. Other embodiments would not need this DIC functionality. A sensor chip can be used to record the DIC images. An example of a suitable sensor chip is a CMOS optical sensor chip having 9.9 micron sensor pixels (e.g. MT9V403C12STM sensor chip manufactured by Micron technology, Inc.). In some cases, the conventional microscope 250 operates with a 40×, N.A.=0.75 objective having a resolution of 0.49 microns. As the conventional microscope 250 magnifies the image by the magnification factor, the projected image should have a resolution of 20 microns. In the illustrated example, the WIS 100 has an effective image pixel size of 11 microns. The WIS system 200 employing the WIS 100 can accomplish a resolution of 0.55 microns (only 10% off its specific resolution). In general, the WIS 100 of embodiments performs even better with higher magnification objectives. For example, a 60×, N.A.=0.9 objective and a 100×, N.A.=1.3 objective based microscope would be able to achieve their specific resolution of 0.41 microns and 0.28 microns, respectively, with the WIS system 200.

FIGS. 7(a)-7(e) are images of an unstained wild-type hermaphrodite adult *Caenorhabditis elegans* (worm) around its vulva, taken with various microscope devices. The specimen was unstained and prepared by placing it on an agarose pad (2% agarose in M9 buffer) over a microscope slice, and paralyzing it with 0.6% sodium azide. The specimen was covered with a cover slip. A 100× objective lens (N.A.=1.3) and a condenser lens (N.A.=0.9) were used during imaging.

Figure 7A:
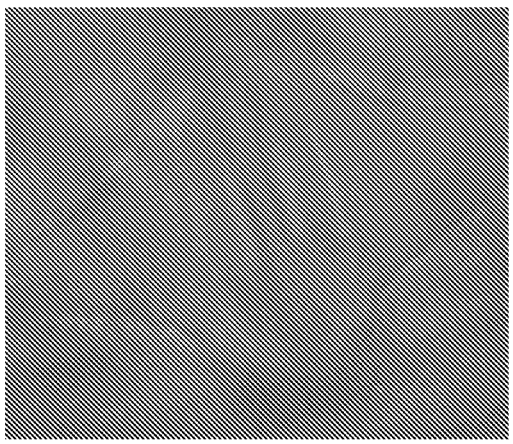
FIG. 7(a) is an intensity/amplitude image of the worm taken by a conventional bright field microscope.
Figure 7B:
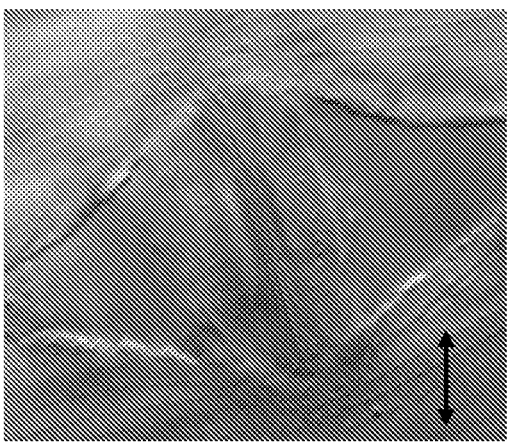
FIG. 7(b) is a DIC image (shear direction is along the y axis throughout the imaging experiments in this article) of the worm taken by a conventional DIC microscope.
Figure 7C:
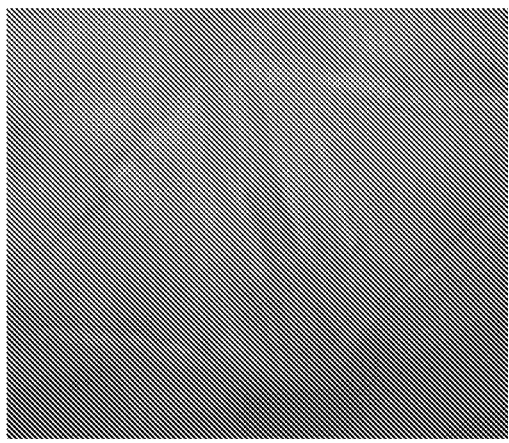
FIG. 7(c) is an intensity image of the worm taken by a microscope employing a WIS (Wavefront Microscope), according to an embodiment of the invention.
Figure 7D:
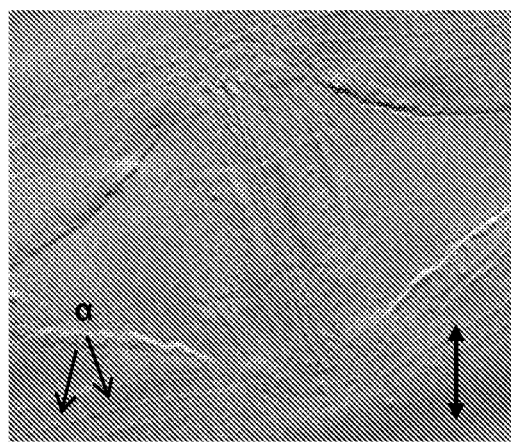
FIG. 7(d) is a normalized phase gradient image along the y axis of the worm taken by the Wavefront Microscope, according to an embodiment of the invention.
Figure 7E:
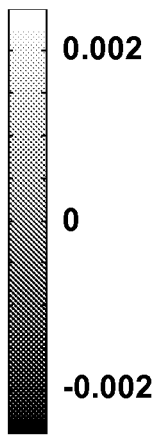
FIG. 7(e) is a normalized phase gradient image along the x axis of the worm taken by the Wavefront Microscope, according to an embodiment of the invention.
Figure 7E:
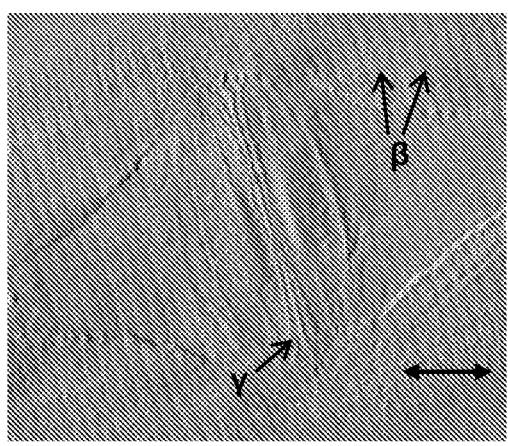

FIG. 7(a) is an intensity/amplitude image of the worm taken by a conventional bright field microscope. FIG. 7(b) is a DIC image (shear direction is along the y axis throughout the imaging experiments in this article) of the worm taken by a conventional DIC microscope. Because the specimen was not stained, the DIC image provides better contrast than the bright-field image. FIG. 7(c) is an intensity image of the worm taken by a microscope employing a WIS 100 (Wavefront Microscope), according to an embodiment of the invention. FIG. 7(d) is a normalized phase gradient image along the y axis of the worm taken by the Wavefront Microscope, according to an embodiment of the invention. FIG. 7(e) is a normalized phase gradient image along the x axis of the worm taken by the Wavefront Microscope, according to an embodiment of the invention. The images in FIGS. 7(a)-7(c) were rendered from a single data acquisition process. As shown, the intensity image taken by the Wavefront Microscope is consistent with the intensity image taken by the bright field microscope. In addition, the y-directional normalized phase gradient image taken by the Wavefront Microscope is consistent with the DIC image. However, the x-directional normalized phase gradient image taken by the Wavefront Microscope contains phase information orthogonal to the DIC image and our y-directional normalized phase gradient image, and reveals different details of the object. For example, dense bodies (identified by α indicator) are clearly shown in y-directional normalized phase gradient image, while the vulva slit, furrow and annuli (identified by γ and β indicators) on the skin are more obvious in x-directional normalized phase gradient image.

Conventional DIC images carry mixed amplitude and phase information as discussed in M. R. Arnison, K. G. Larkin, C. J. R. Sheppard, N. I. Smith, and C. J. Cogswell, "Linear phase imaging using differential interference contrast microscopy," Journal of Microscopy-Oxford 214, 7-12 (2004), which is hereby incorporated by reference in its entirety for all purposes. As such, conventional DIC images of stained specimens can be ambiguous where a dark spot in the images may be attributable to an absorption site or a location where the normalized phase gradient has a large negative value.

FIGS. 8(a)-8(e) are images taken of stained ascaris undergoing cell division (fixed by 10% formalin and stained with hematoxylin), taken with various microscope devices. A 40× objective lens (N.A.=0.75) and a condenser lens (N.A.=0.5) were used during imaging.

Figures 8A, 8B:
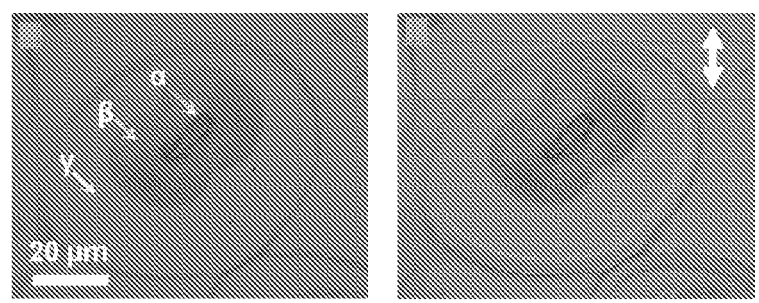
FIG. 8(a) is an intensity/amplitude image of the ascaris taken by a conventional bright field microscope.
FIG. 8(b) is a DIC image of the ascaris taken by a conventional DIC microscope.
Figures 8C, 8D:
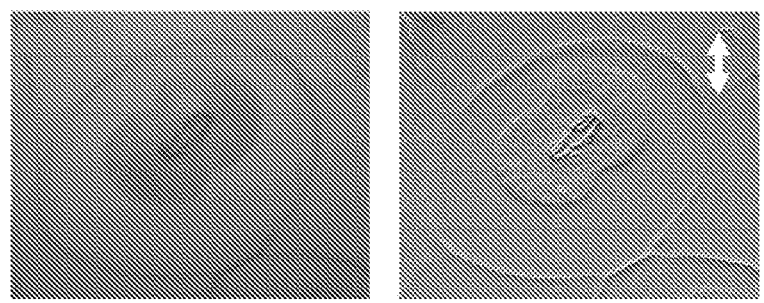
FIG. 8(c) is an intensity image of the ascaris taken by a microscope employing a WIS (Wavefront Microscope), according to an embodiment of the invention.
FIG. 8(d) is a normalized phase gradient image along the y axis of the ascaris taken by the Wavefront Microscope, according to an embodiment of the invention.
Figure 8E:
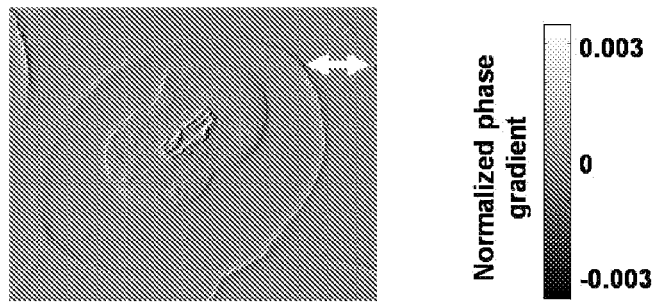
FIG. 8(e) is a normalized phase gradient image along the x axis of the ascaris taken by the Wavefront Microscope, according to an embodiment of the invention.

FIG. 8(a) is an intensity/amplitude image of the ascaris taken by a conventional bright field microscope. FIG. 8(b) is a DIC image of the ascaris taken by a conventional DIC microscope. The stained chromosomes of the ascaris appear as dark regions in both the bright-field image of FIG. 8(a) and the DIC image of FIG. 8(b). If the conventional DIC microscope where a pure phase imager, one edge of the chromosome clump would appear brighter and the other edge would appear darker (chromosomes are optically denser than the nucleoplasm). The average brightness should remain the same as the background. FIG. 8(c) is an intensity image of the ascaris taken by a microscope employing a WIS 100 (Wavefront Microscope), according to an embodiment of the invention. FIG. 8(d) is a normalized phase gradient image along the y axis of the ascaris taken by the Wavefront Microscope, according to an embodiment of the invention. FIG. 8(e) is a normalized phase gradient image along the x axis of the ascaris taken by the Wavefront Microscope, according to an embodiment of the invention. The normalized phase gradient images shown in FIGS. 8(d) and 8(e) taken by the Wavefront Microscope show a relief-like image which is the signature of a correct phase gradient image. Additionally, the bright-field microscope and Wavefront Microscope intensity images shown in FIGS. 8(a) and 8(c) are very similar in appearance.

Figure 8F:
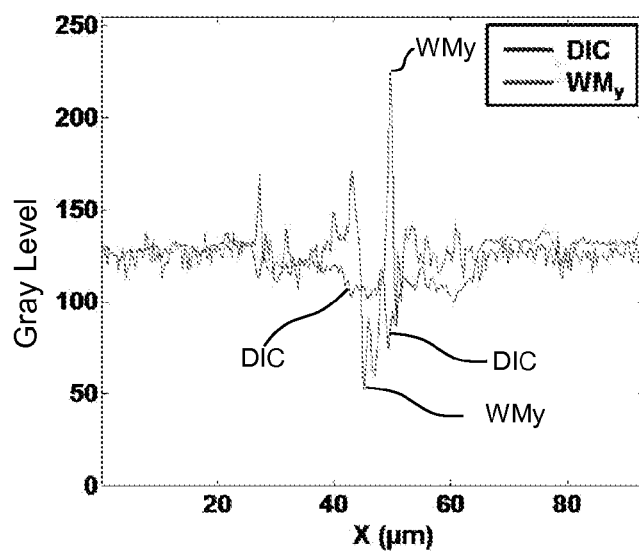
FIG. 8(f) is a graph comparing the line profiled from the DIC image and the DIC phase gradient image in the y-axis, according to an embodiment of the invention.

FIG. 8(f) is a graph comparing the line profiled from the DIC image and the DIC phase gradient image in the y-axis, according to an embodiment of the invention. This graph further highlights the difference. The DIC trace has an obvious signal dip in the middle that is attributable to light absorption by the stain while such a dip is absent from the Wavefront Microscope trace.

Many biological samples, such as muscle tissues and collagen matrices, show strong birefringence properties due to their asymmetrical structural arrangements. Conventional DIC microscopes can generate artifacts when imaging birefringent samples. This is because the difference in refractive indices along orthogonal axes of the sample disrupts the polarization condition in the DIC microscope, which is described in X. Q. Cui, M. Lew, and C. H. Yang, "Quantitative differential interference contrast microscopy based on structured-aperture interference," Applied Physics Letters 93, 3 (2008) and S. B. Mehta, and C. J. R. Sheppard, "Quantitative phase-gradient imaging at high resolution with asymmetric illumination-based differential phase contrast," Optics Letters 34, 1924-1926 (2009), which are hereby incorporated by reference in their entirety for all purposes. Since the Wavefront microscope employing the WIS 100 does not rely on polarized light for its phase imaging, the Wavefront Microscope can image birefringent samples without artifacts.

FIGS. 9(a)-9(e) are images taken of a strongly birefringent ctenoid fish scale specimen, taken with various microscope devices. The ctenoid fish scale specimen was from a fresh striped bass and kept in 1×PBS solutions between the microscope slide and cover slip. A 10× objective lens (N.A.=0.3) and a condenser lens (N.A.=0.2) were used during imaging.

Figure 9:
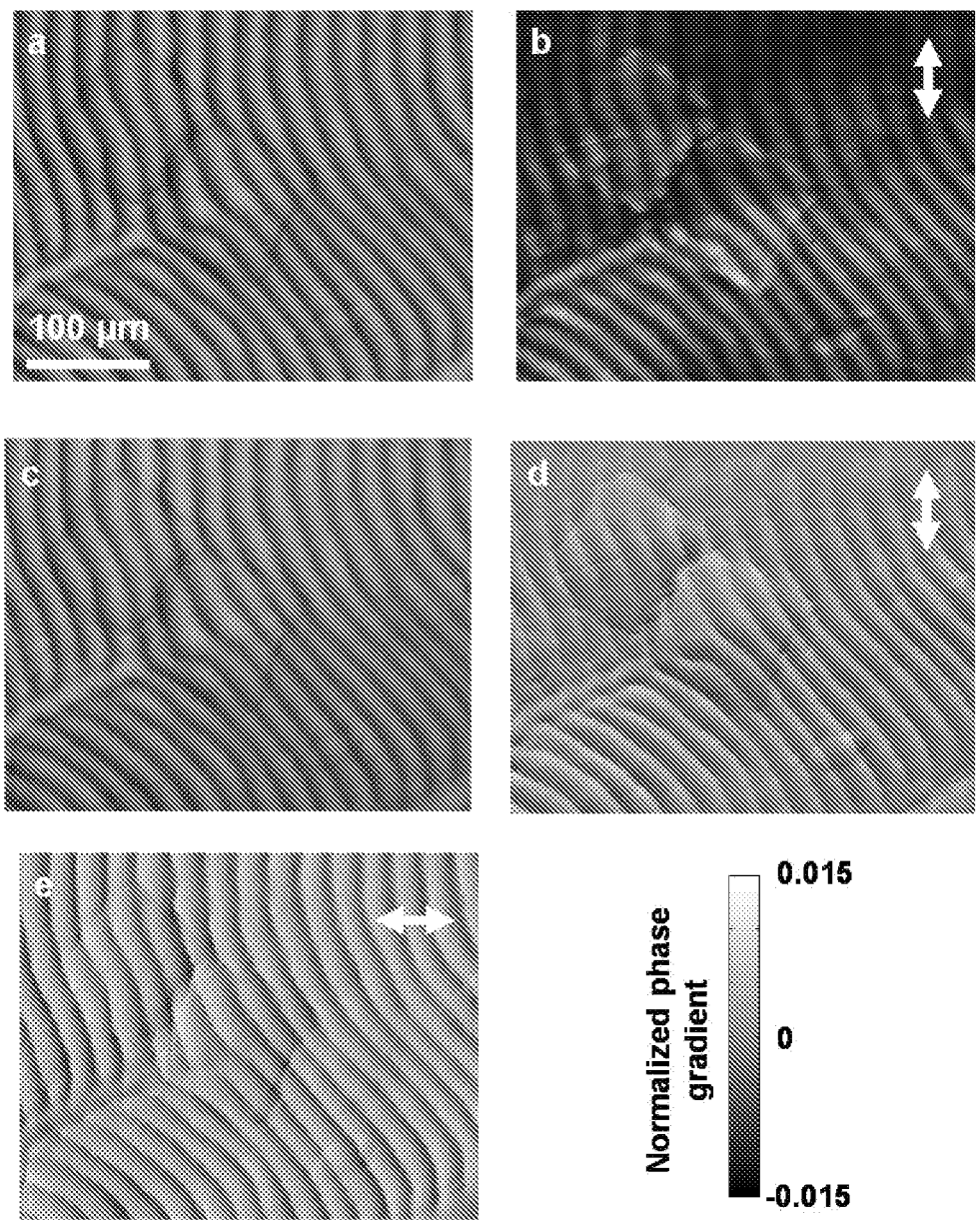
FIG. 9(a) is an intensity/amplitude image of the strongly birefringent ctenoid fish scale taken by a conventional bright field microscope.
FIG. 9(b) is a DIC image of the strongly birefringent ctenoid fish scale taken by a conventional DIC microscope.
FIG. 9(c) is an intensity image of the strongly birefringent ctenoid fish scale taken by a microscope employing a WIS (Wavefront Microscope), according to an embodiment of the invention.
FIG. 9(d) is a normalized phase gradient image along the y axis of the strongly birefringent ctenoid fish scale taken by the Wavefront Microscope, according to an embodiment of the invention.
FIG. 9(e) is a normalized phase gradient image along the x axis of the strongly birefringent ctenoid fish scale taken by the Wavefront Microscope, according to an embodiment of the invention.

FIG. 9(a) is an intensity/amplitude image of the strongly birefringent ctenoid fish scale taken by a conventional bright field microscope. FIG. 9(b) is a DIC image of the strongly birefringent ctenoid fish scale taken by a conventional DIC microscope. FIG. 9(c) is an intensity image of the strongly birefringent ctenoid fish scale taken by a microscope employing a WIS 100 (Wavefront Microscope), according to an embodiment of the invention. FIG. 9(d) is a normalized phase gradient image along the y axis of the strongly birefringent ctenoid fish scale taken by the Wavefront Microscope, according to an embodiment of the invention. FIG. 9(e) is a normalized phase gradient image along the x axis of the strongly birefringent ctenoid fish scale taken by the Wavefront Microscope, according to an embodiment of the invention. The bright-field and Wavefront Microscope intensity images shown in FIGS. 9(a) and 9(c) are consistent with each other. However, the DIC image in FIG. 9(b) has a birefringence artifact shown as a brightness variation across the image which can obstruct viewing of fine structures on the fish scale. In contrast, the Wavefront Microscope images did not have a birefringent artifact. The square and diamond shaped structures are clearly imaged in both the normalized phase gradient images in FIGS. 9(d) and 9(e) taken by the Wavefront Microscope.

The phase of a light wave can be a fixed scalar potential function. In this case, the two orthogonal normalized phase gradient $\theta_x$ and $\theta_y$ measurements taken by a WIS 100 comprise a complete set of the phase gradient information for the light wave.

In many embodiments, a WIS system 200 employing a WIS 100 (e.g., a Wavefront Microscope or a Wavefront Camera) determines phase gradient information in two orthogonal directions along the x-axis and the y-axis. The WIS system 200 can use this phase gradient information to generate suitable phase gradient images such as the two orthogonal normalized $\theta_x$ and $\theta_y$ images or other phase gradient images that may be more amenable to the user's needs. In addition, the WIS system 200 can also use the phase gradient information (or portion thereof) in two orthogonal directions along with the amplitude information to reconstruct a combined wavefront image.

In one example, the WIS system 200 can generate phase gradient images along any direction $\vec{n}$. In this example, the WIS system 200 can determine the phase image of the specimen along any direction $\vec{n}$ by simply taking the inner product of the unit direction vector $\vec{n}$ and the spatial phase-gradient-vector $\vec{\theta} = \theta_x \vec{i} + \theta_y \vec{j}$. In some cases, the phase image along a specific direction $\vec{n}_1$ can provide enhanced contrast relative to the two orthogonal normalized phase gradient $\theta_x$ and $\theta_y$ images. In a conventional DIC microscope, this can only be done by imaging at another orientation. In one embodiment, the user defines the direction vector $\vec{n}$. The WIS system 200 can generate phase images along the user-defined direction $\vec{n}$.

Figure 10:
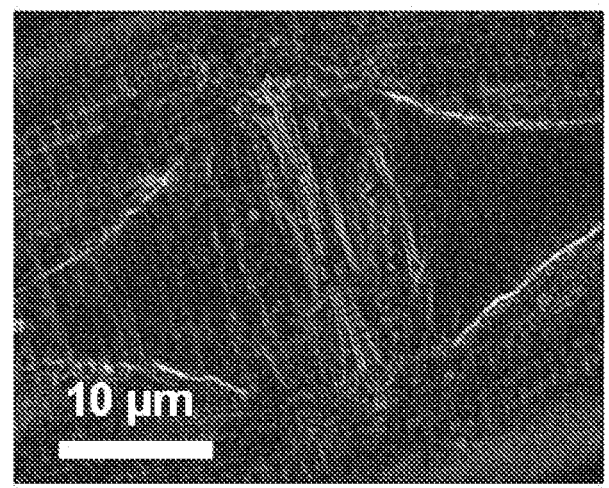
FIG. 10 is a phase-gradient-vector magnitude image of the unstained worm of FIGS. 7(a)-7(e) taken with a Wavefront Microscope, according to an embodiment of the invention.
Figure 10:
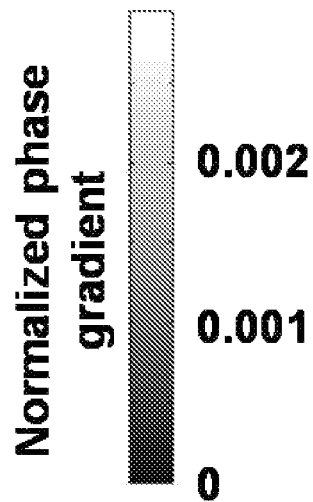

In another example, the WIS system 200 can generate a phase gradient image based on the magnitude of the phase-gradient-vector. In this example, the WIS system 200 determines the magnitude of the phase-gradient-vector given $|\vec{\theta}| = \sqrt{\theta_x^2 + \theta_y^2}$ and then generates a magnitude image based on the determined values of the magnitude. In some cases, a magnitude image can better highlight the boundaries of a specimen, especially where the phase changes dramatically. In this example, the WIS system 200 can generate maps of the magnitude of the phase-gradient vector for applications such as automatic segmentation and counting for cells or other subcellular organelles. These maps can be objective since they are not dependent on the relative orientation of the specimen to the imaging axis. Similar maps generated by a conventional DIC microscope are dependent on the relative orientation of the specimen to the imaging axis. FIG. 10 is a phase-gradient-vector magnitude image of the unstained worm of FIGS. 7(a)-7(e) taken with a Wavefront Microscope, according to an embodiment of the invention. As shown, the magnitude image delineates the specimen features well.

C. Other System Components

Figure 11:
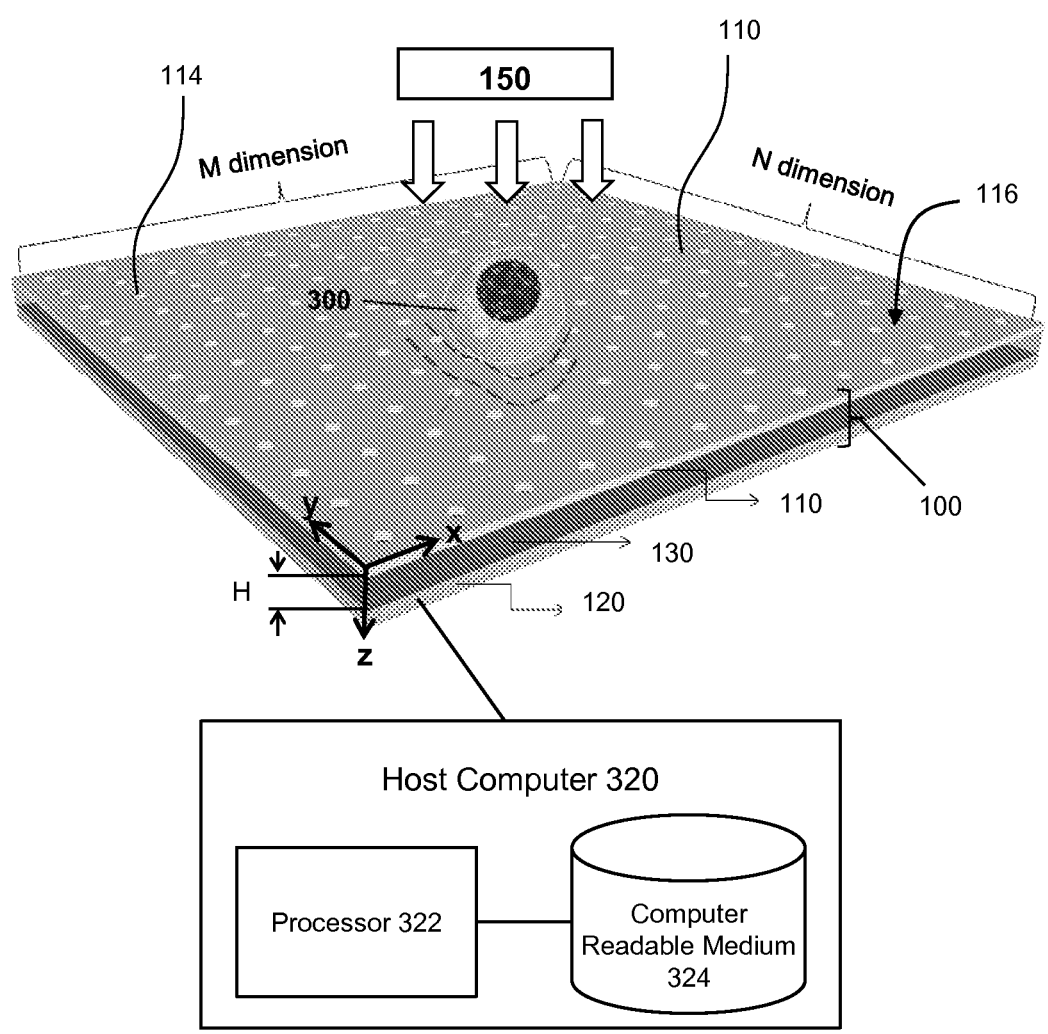
FIG. 11 is perspective view of components of a WIS system including processing components, according to embodiments of the invention.

FIG. 11 is perspective view of components of a WIS system 200 including processing components, according to embodiments of the invention. The illustrated WIS system 200 can be an example of a Wavefront Microscope or a Wavefront Camera in some embodiments.

The illustrated WIS system 200 includes a WIS 100 having an aperture layer 110, a light detector 120, and a transparent layer 130 between the aperture layer 110 and the light detector 120. The WIS 100 also includes a reference x-axis, y-axis and a z-axis. The aperture layer has a thickness of H. The aperture layer also includes a surface 116. The apertures 114 in the aperture layer 110 are in the form of an M×N two-dimensional array of apertures 114. An illumination source 150 is shown providing illumination.

The WIS system 200 of embodiments of the invention may also include processing components such as components used in image processing. In the illustrated embodiment, the WIS system 200 includes a host computer 320 in communication with the light detector 120. In other embodiments, the host computer 320 can be a separate device from the WIS system 200. In the illustrated embodiment, the host computer 320 includes a processor 322 (e.g., a microprocessor) coupled to a computer readable medium 324 (CRM). Although the processor 322 and CRM 324 are shown as components of the WIS system 200, in other embodiments the processor 322 and/or CRM 324 can be components of the WIS 100, or can be separate components from the WIS system 200. In addition, the WIS system 200 can have any number of other suitable components such as optics, condensers, a display, other processors, etc. For example, a suitable display may be communicatively coupled to the processor 322 to provide information such as the image of the object 300 to a user of the WIS system 200.

The processor 322 may be integrated or separate from the light detector 120. The processor 322 receives signals with light data from the light detecting elements 122 of the light detector 120 associated with the light received by the light detecting elements 122. The light data may include the intensity of the light, the wavelength(s) of the light, and/or other information about the light received by the light detecting elements 122. The processor 322 executes code for performing some of the functions of the WIS system 200.

The CRM (e.g., memory) 324 can store the code for performing the functions of WIS system 200. The code is executable by the processor 322. In one embodiment, the CRM 324 comprises a) code for calibrating a WIS 100, b) code for determining the light projection associated with a particular aperture based on the intensity readings from the corresponding grid of light detecting elements, c) code for determining lateral shifts in the light projections, d) code for determining intensity and/or phase gradient variations, e) code for determining an image of the object 300 based on intensity and/or phase gradient variations, f) code for determining phase gradient in a particular direction, g) code for displaying the image, h) any other suitable code for image processing or other processing functions of the WIS system 200. The CRM 324 may also include code for performing any of the signal processing or other software-related functions that may be created by those of ordinary skill in the art. The code may be in any suitable programming language including C, C++, Pascal, etc.

In one embodiment, a WIS system 200 may include a WIS 100 deployed in an optofluidic microscope imaging scheme, which may provide high throughput capabilities. In this embodiment, the WIS system 200 includes a body that is a multi-layer structure. The body forms or includes a fluid channel having a first surface. The fluid channel may have any suitable dimensions (e.g., 1, 5, 10 microns). The body includes an aperture layer 110 with apertures 114 in any suitable form. Some examples of suitable forms include a slit, a one-dimensional array, a two-dimensional array, or a multiplicity of one-dimensional and/or two-dimensional arrays. The apertures 114 can be in any suitable orientation. For example, the apertures 114 may be located at an angle with respect to a longitudinal axis of the fluid channel. The apertures 114 may also extend collectively across the fluid channel. The body also includes a light detector 120 and transparent layer 130 between the light detector 120 and the aperture layer 110. In some cases, the light detector 120 may be located at a self-focusing plane 160. The WIS system 200 of this embodiment also includes an illumination source 150 to the outside of the aperture layer 110 for providing the incident light. As a fluid flows through the fluid channel, an object 300 in the fluid is illuminated by the illumination source and modulates the light inducing an image wavefront. The light detector 120 has light detecting elements 122 for taking time varying readings of light projections received through the apertures 114 as the object 300 travels through the fluid channel. The time varying readings can be used to determine both amplitude/intensity and phase variations. The WIS system 200 can use the time varying readings to reconstruct image(s) of the object 300 based on phase gradient and/or intensity/amplitude.

In one embodiment, quantitative phase imaging provided by a WIS system 200 can be useful to quantify the optical thickness of a cell or organelle and determine the chemical concentration in a microfluidic system. Examples of conventional systems that use complicated interferometer schemes in these applications can be found in G. Popescu, T. Ikeda, R. R. Dasari, and M. S. Feld, "Diffraction phase microscopy for quantifying cell structure and dynamics," Optics Letters 31, 775-777 (2006) and J. G. Wu, Z. Yaqoob, X. Heng, L. M. Lee, X. Q. Cui, and C. H. Yang, "Full field phase imaging using a harmonically matched diffraction grating pair based homodyne quadrature interferometer," Applied Physics Letters 90, 3 (2007), which are hereby incorporated by reference in their entirety for all purposes. The use of the WIS system 200 such as a Wavefront Microscope provides an alternate approach that is simple to set up and easy to use.

In another embodiment, a WIS system 200 such as a Wavefront Microscope can include corrections of the aberrations generated by the heterogeneity of tissue samples via adaptive optics strategies to facilitate deep tissue imaging of multiphoton microscopy. Examples of these corrections can be found in M. J. Booth, M. A. A. Neil, R. Juskaitis, and T. Wilson, "Adaptive aberration correction in a confocal microscope," Proceedings of the National Academy of Sciences of the United States of America 99, 5788-5792 (2002) and M. Rueckel, J. A. Mack-Bucher, and W. Denk, "Adaptive wavefront correction in two-photon microscopy using coherence-gated wavefront sensing," Proceedings of the National Academy of Sciences of the United States of America 103, 17137-17142 (2006), which are hereby incorporated by reference in their entirety for all purposes.

Modifications, additions, or omissions may be made to the WIS 100 and/or WIS system 200 without departing from the scope of the disclosure. The components of the WIS 100 and/or WIS system 200 may be integrated or separated according to particular needs. For example, the processor 322 may be a component of the light detector 120. Moreover, the operations of the WIS 100 and/or WIS system 200 can be performed by more, fewer, or other components. Additionally, operations of the WIS 100 and/or WIS system 200 may be performed using any suitable logic comprising software, hardware, other logic, or any suitable combination of the preceding.

II. Operational Methods

A. Methods for Estimating the Center/Lateral Shifts of the Light Projection

In many embodiments, the WIS system 200 estimates the center of each light projection measured by the light detector 120 at an aperture 114. If modulated light is impinging the aperture 114 during measurement of the light projection, the estimated center of the light projection can also be the estimated lateral shift of the light projection due to the phase gradient in the modulated light. The precision of estimating lateral shifts of a light projection is described in E. Betzig, G. H. Patterson, R. Sougrat, O. W. Lindwasser, S. Olenych, J. S. Bonifacino, M. W. Davidson, J. Lippincott-Schwartz, and H. F. Hess, "Imaging intracellular fluorescent proteins at nanometer resolution," Science 313, 1642-1645 (2006) and M. J. Rust, M. Bates, and X. W. Zhuang, "Sub-diffraction-limit imaging by stochastic optical reconstruction microscopy (STORM)," Nature Methods 3, 793-795 (2006), which are hereby incorporated by reference in their entirety for all purposes.

Any suitable method can be used to estimate the center of each light projection. In some embodiments, a WIS system 200 can use a centroid method to estimate the center of each light projection. However, because the centroid method assigns significant weight to noise-corrupted data from dark light detecting elements 122 (sensor pixels), it can be an unstable position estimator in some cases. In other embodiments, a WIS system 200 can use the Fourier-demodulation algorithms to estimate the center of light projections arranged in an approximately regular grid. This method can be more robust than the centroid method in some cases. An example of the Fourier-demodulation algorithms can be found in Y. Carmon, and E. N. Ribak, "Phase retrieval by demodulation of a Hartmann-Shack sensor," Opt. Commun. 215, 285-288 (2003), which is hereby incorporated by reference in its entirety for all purposes.

1. Cyclic Algorithm

In many embodiments, a WIS system 200 can use a cyclic algorithm to estimate the center of each light projection measured by the light detector 120. The cyclic algorithm uses cyclic and uni-norm complex weights in its estimations.

To illustrate the principle underlying the cyclic algorithm, a one-dimensional case along an s-axis is discussed below. Suppose the intensity distribution of a light projection (spot) on the light detector 120 is I(s) and concentrated in a window [−T/2, T/2], a complex number complex number $\tilde{s}_0$ can be defined for its initial position as:

$$\tilde{s}_0 = \int_{-T/2}^{T/2} I(s) \exp\left(i \frac{2\pi}{T} s\right) ds \quad (4)$$

If the center of the light projection shifts Δs, the complex number $\tilde{s}_1$ for the second position will be:

$$\begin{aligned} \tilde{s}_1 &= \int_{-T/2}^{T/2} I(s - \Delta s) \exp\left(i \frac{2\pi}{T} s\right) ds \\ &= \int_{-T/2-\Delta s}^{T/2-\Delta s} I(u) \exp\left(i \frac{2\pi}{T}(u + \Delta s)\right) du \\ &= \exp\left(i \frac{2\pi}{T} \Delta s\right) \int_{-T/2-\Delta s}^{T/2-\Delta s} I(u) \exp\left(i \frac{2\pi}{T} u\right) du \\ &\approx \exp\left(i \frac{2\pi}{T} \Delta s\right) \tilde{s}_0 \end{aligned} \quad (5)$$

The last approximation is true when Δs<<T, which is the case for a WIS system 200 (e.g., Wavefront Microscope/Camera) in many embodiments. Thus, $\tilde{s}_1$ is $\tilde{s}_0$ rotated by an angle $$\frac{2\pi}{T} \Delta s$$

in the complex plane, so that the lateral shift of the light projection can be easily calculated from the above two complex numbers using the following:

$$\Delta s = \frac{T}{2\pi}[\text{angle}(\tilde{s}_1) - \text{angle}(\tilde{s}_0)] \quad (6)$$

In many embodiments, the discrete data from a two-dimensional array (grid) of M×N light detecting elements 122 (e.g., sensor pixels) can be assigned to each aperture 114 in an aperture layer 110 of a WIS 100. The s-axis and t-axis are at the centerline of the two-dimensional array as shown in FIG. 2(a). The horizontal and vertical indexes of the light detecting elements 122 are m=−M, . . . −1, 0, 1, . . . M and −2, −1, 0, 1, 2 and n=N, ... −1, 0, 1, ... N respectively. For example, a 5×5 two-dimensional array of light detecting elements 122 with horizontal and vertical indexes of the light detecting elements equal m=−2, −1, 0, 1, 2 and n=−2, −1, 0, 1, 2 can be assigned to a specific aperture 114 in the aperture layer 110.

Based on this assignment, the integrals in Eqns. 4-6 can be replaced with the following summations:

$$\tilde{s}_0 = \sum_{m=-2,\,n=-2}^{2} \sum_{n=-2}^{2} I_{mn}(s)\exp\left(i\frac{2\pi}{5}n\right) \quad \text{7(a)}$$

$$\tilde{s}_1 = \sum_{m=-2,\,n=-2}^{2} \sum_{n=-2}^{2} I_{mn}(s-\Delta s)\exp\left(i\frac{2\pi}{5}n\right) \quad \text{7(b)}$$

$$\Delta s = \frac{5}{2\pi}[\text{angle }(\tilde{s}_1) - \text{angle }(\tilde{s}_0)] \quad \text{7(c)}$$

Any bias introduced by the replacement above can be corrected by the calibration method described in the following section. A corresponding set of equations can be used to determine $\Delta t$.

The WIS system 200 can use Eqns. 7(a)-7(c) and the corresponding equations for $\Delta t$ to estimate the center ($\Delta s$ and $\Delta t$) of the light projection. If modulated light is impinging the aperture 114, the estimated center of the light projection is the estimated lateral shift of the light projection. Thus, the WIS system 200 can use Eqns. 7(a)-7(c) and the corresponding equations for $\Delta t$ to estimate the lateral shifts ($\Delta s$ and $\Delta t$) of the light projection if modulated light is impinging the aperture 114.

B. Calibration Methods

In some embodiments, a WIS system 200 can be used to calibrate the WIS 100 by testing its linearity and sensitivity. The testing results can be used to tune the phase gradient response of the WIS 100 based on the linearity and determine whether modifications to the WIS 100 improve or worsen the WIS 100 based on the sensitivity.

To test the linearity and sensitivity of the WIS 100, various methods can be employed. In one exemplary method, the WIS system 200 introduces specific normalized phase gradients to all apertures 114 in the aperture layer 110 of a WIS 100. These phase gradients are introduced by illuminating the apertures 114 with an illumination source 150 (e.g., a plane halogen light) at specific incident angles $\theta_x$ and $\theta_y$. The phase gradient response is measured for each of the specific normalized phase gradient to generate calibration curve(s).

From the slope of the calibration curve, the WIS system 200 can be used to estimate the exact distance $H_0$ between the aperture layer 110 and the active areas on the light detecting elements 122. As shown in Eqns. (1) and (2), the distance H between the aperture layer 110 and the light detector 120 is used to determine how well the WIS 100 responds to the normalized phase gradient of the wavefront. Therefore, the normalized phase gradient response of the WIS 100 can be tuned using the exact distance $H_0$ from the calibration curve.

In addition, the variance of the calibration data can be used to determine the sensitivity of the WIS 100. By modifying the components of the WIS 100 and monitoring the variance during and/or after the modification, it can be determined whether the modification has improved or worsened the results from the WIS 100.

Figure 12A:
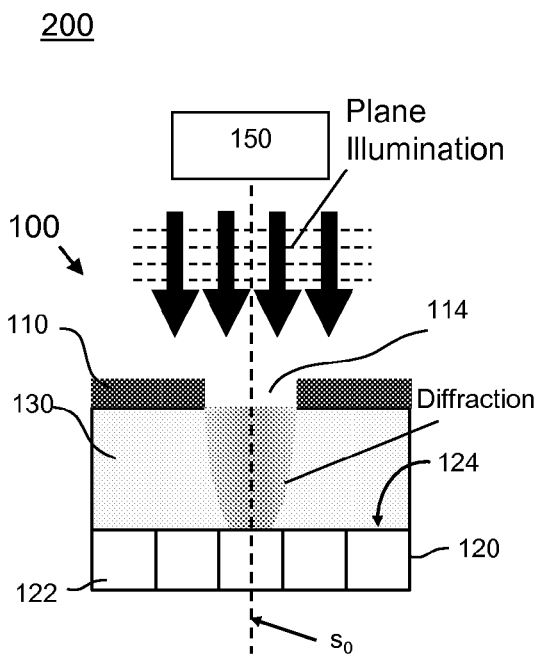
FIGS. 12 (a) and 12(b) show a side view of components of a WIS system for calibrating a WIS, according to an embodiment of the invention.
FIGS. 12(c) and 12(d) are graphs of the normalized phase gradient response in both x and y directions to different incident angles $\theta_x$ and $\theta_y$, according to this embodiment.
Figure 12B:
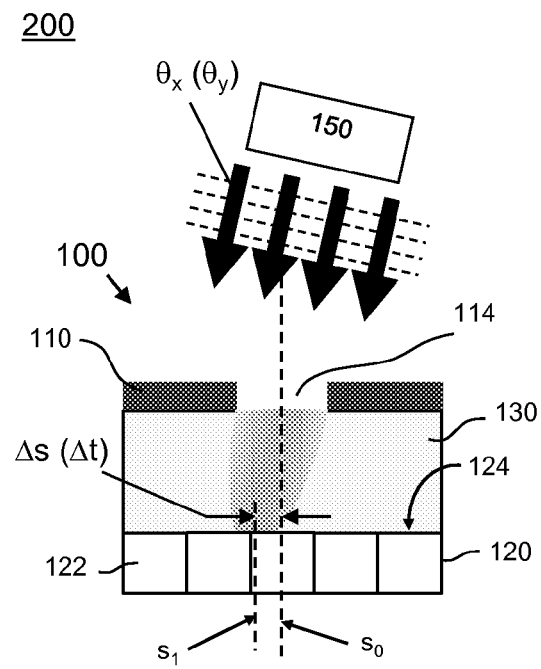

FIGS. 12(a) and 12(b) show a side view of components of a WIS system 200 for calibrating a WIS 100, according to an embodiment of the invention. The components of the WIS system 200 include a portion of the WIS 100 being calibrated. The portion of the WIS 100 includes an aperture layer 110 having an aperture 114, a light detector 120 having light detector elements 122 and a surface 124, and a transparent layer 130 (e.g., SU8 material layer) between the aperture layer and the light detector 120. The transparent layer 130 has a thickness H. In FIG. 12(a), an illumination source 150 provides plane illumination 140 at a zero degree incident angle, according to an embodiment of the invention. In this illustration, the light projection is shown centered around $s=s_0$ ($t=t_0$). In FIG. 12(b), an illumination source 150 provides illumination 140 at a specific incident angle of $\theta_x$ ($\theta_y$) associated with a specific normalized phase gradient. In this illustration, the light projection is shown centered around $s=s_1$ ($t=t_1$). The lateral shift of the projections is shown as $\Delta s$ ($\Delta t$), which is equal to $s_1$-$s_0$. In this exemplary method, the aperture layer 110 in FIG. 12(b) is illuminated at various incident angles $\theta_x$ and $\theta_y$ to test the phase gradient response of WIS 100.

Figure 12C:
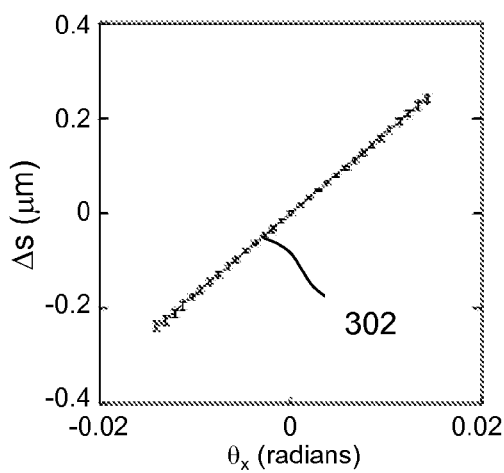
Figure 12D:
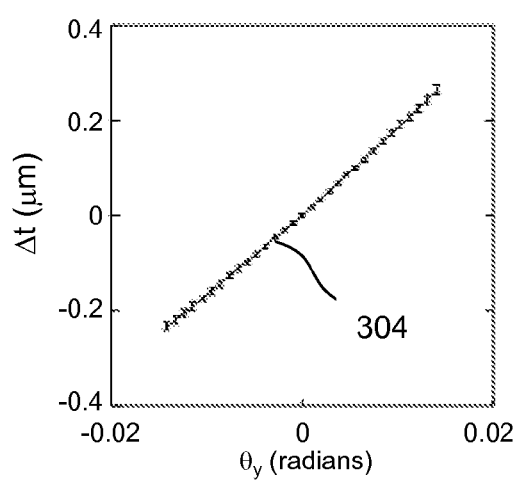

FIGS. 12(c) and 12(d) are graphs of the normalized phase gradient response in both x and y directions to different incident angles $\theta_x$ and $\theta_y$, according to this embodiment. The WIS 100 associated with this phase gradient response in these graphs includes an aperture layer 110 having 350 apertures. In these graphs, each data point is an average normalized phase gradient measurement from the 350 apertures of the central row of the WIS 100. Each error bar in the illustrated graphs corresponds to the standard deviation among them. The normalized phase gradient variation between apertures is ~0.5 mrad.

FIGS. 12(c) and 12(d) include calibration curves 302 and 304 from the phase gradient response, according to an embodiment of the invention. From the slopes of the calibration curves 302 and 304, the distance from the aperture 114 of the WIS 100 to the surface 124 of the photo-sensitive areas of the light detector 120 can be estimated. For example, these distances can be 27.2 microns and 28.0 microns in the x and y directions respectively, assuming that an effective refractive index of the transparent layer 130 is 1.6. Any difference between these two distances can be used to determine whether there is an aperture to light detector grid misalignment in the x and y directions. From the fluctuation of each light projection over time, the sensitivity of the normalized phase gradient measurement in WIS 100 can be estimated. In the above, example, the sensitivity was estimated to be greater than 0.1 mrad under the typical working condition −1.0 second total signal accumulation time and 9.2 $\mu W/cm^2$ light intensity on the light detector.

C. Exemplary Method of Operating

Figure 13:
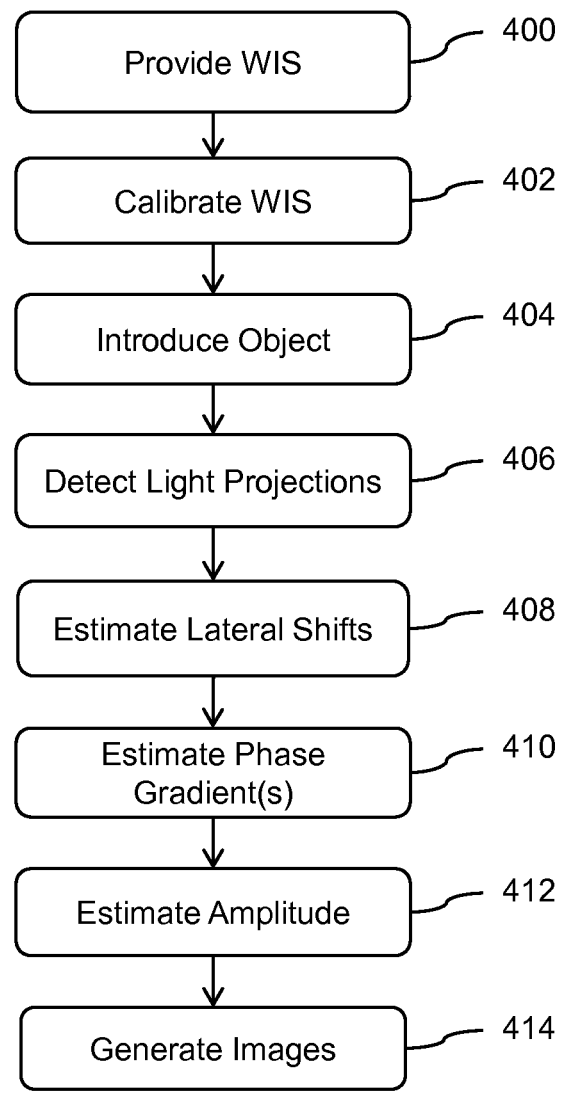
FIG. 13 is a flow chart of method of using a WIS system having a WIS to detect a light projection and/or image an object, according to embodiments of the invention.

FIG. 13 is a flow chart of method of using a WIS system 200 having a WIS 100 to detect a light projection and/or image an object 300, according to embodiments of the invention. The WIS 100 includes an aperture layer having apertures, a light detector and a transparent layer between the aperture layer and the light detector. The WIS system 200 can be of any suitable type such as a Wavefront Microscope, Wavefront Camera, or other suitable wavefront device.

The method begins with providing a WIS 100 (step 400). In many embodiments, the WIS 100 has been designed to operate in the high Fresnel number regime. In these embodiments, the light detector 120 of the WIS 100 is designed to be located approximately at a self-focusing plane 160. In this high Fresnel Number design, a thickness H of the transparent layer 130 is determined that will locate the light detector 120 at the self-focusing plane 160 given a particular aperture size d, refractive index n of the transparent layer 130, and a given wavelength $\lambda$ of the incident light.

In some cases, a WIS system 200 similar to the one illustrated in FIG. 4 can be used to experimentally estimate a distance $z_0$ to the self-focusing plane 160 for a given aperture size d, refractive index n of the transparent layer 130, and wavelength λ of the incident light. The WIS system 200 determines the radius of light projections at different distances from the aperture layer 110. The WIS system 200 then determines the minimum radius light projection 190 and then determines the location $z_0$ along the z-axis of the minimum radius light projection 190. This location is the determined location of the self-focusing plane 160. The WIS 100 can be designed with a thickness H of the transparent layer 130 equal to the distance $z_0$ to place the light detector 120 at the self-focusing plane.

In other cases, the thickness H of the transparent layer 130 can be determined based on Eqn. (3) using the aperture size d, refractive index n of the transparent layer 130, wavelength λ of the incident light, and a high Fresnel number. The high Fresnel number can be any suitable number. In one example, a high Fresnel number is a number close to 1.0 such as 0.86. The WIS 100 can be designed with the determined thickness H of the transparent layer 130 that provides the given high Fresnel number.

Next, the WIS 100 can be calibrated by the user or by the processor 322 (step 402). Any suitable measurement of the WIS 100 can be calibrated. In addition, any suitable method can be used to calibrate the WIS 100. In some embodiments, this step may be eliminated or may be a separation operation from this method.

In some embodiments, the linearity and sensitivity of the phase gradient response of the WIS 100 is checked. The WIS 100 is tested by introducing specific normalized phase gradients to all apertures 114 in the aperture layer 110 of the WIS 100. These phase gradients can be introduced by illuminating the apertures 114 with an illumination source 150 (e.g., a plane halogen light) at specific incident angles $\theta_x$ and $\theta_y$. The phase gradient response is measured for each of the specific normalized phase gradient to generate calibration curve(s).

From the slope of the calibration curves, the WIS system 200 can be used to estimate the exact distance $H_0$ between the aperture layer 110 and the active areas on the light detecting elements 122. The normalized phase gradient response of the WIS 100 can be tuned using the exact distance $H_0$ from the calibration curve(s). In addition, the variance of the calibration data can be used to determine the sensitivity of the WIS 100. By making modifications to components of the WIS 100 and monitoring the variance, it can be determined whether the modification improves or worsens the phase gradient response of the WIS 100.

The object 300 is introduced into light field of the WIS 100 (step 404). The object 300 can be introduced using any suitable technique. For example, the object 30 may be injected with a fluid sample into an input port of the WIS system 200.

Once introduced, the object 300 modulates the light from the illumination source 150 inducing an image wavefront. For example, referring to FIG. 11, a WIS system 200 is shown with an image wavefront induced by an object 300. In this illustration, the aperture layer 110 has apertures in the form of an M×N dimensional array of apertures 114.

Light passing through the apertures 114 is received by the light detector 120. Light passing through the apertures 114 can be received by the light detector 120 as light projections. The light detector 120 receives the light projections 128 through the apertures 114 (step 406). In many cases, a grid of light detecting elements 122 of the light detector 120 is assigned (mapped) to a particular aperture 114. For example, referring to FIGS. 3(a) and 3(b), a 5×5 two-dimensional array of light detecting elements 122 is assigned to each aperture 114. In these cases, the grid of light detecting elements 122 for each aperture 114 detects the intensity distribution of the light projection 128 though the aperture 114.

Next, the lateral shifts of each of the light projections 128 can be estimated by the processor 322 of the WIS system 200 (step 408). Any suitable technique can be used to estimate the lateral shifts of the light projections 128 such as the centroid method, the Fourier-demodulation algorithms, cyclic algorithm, etc.

In one example, the cyclic algorithm is used to determine the lateral shifts (Δs and Δt) of each of the light projections 128. In this example, the processor 322 of the WIS system 200 can use Eqns. 7(a)-7(c) and the corresponding equations for Δt to estimate the lateral shifts. For each aperture 114, the host computer 210 uses the intensity values read from the corresponding grid of light detecting elements 122 assigned (mapped) to the particular aperture 114 in the in Eqns. 7(a)-7(c) to estimate Δs and corresponding equations to Δt to estimate that value.

Once the lateral shifts (Δs and Δt) are determined, the phase gradient can be determined by the processor 322 (step 410). Any suitable phase gradient information may be determined at each aperture (x, y). In one example, the processor 322 determines the normalized phase gradients in two orthogonal directions along x-axis and y-axis using the lateral shifts (Δs and Δt) based on Eqns. (1) and (2).

In another example, the processor 322 can also determine phase gradient information along one or more predetermined directions $\vec{n}$ based on the normalized phase gradients in the two orthogonal directions. In some cases, the user may determine a direction $\vec{n}$. The processor 322 may determine the phase gradient along any direction $\vec{n}$ by simply taking the inner product of the unit direction vector $\vec{n}$ and the spatial phase-gradient-vector $\vec{\theta} = \theta_x \vec{i} + \theta_y \vec{j}$.

In yet another example, the processor 322 can generate a phase gradient information based on the magnitude of the phase-gradient-vector. In this example, the processor 322 determines the magnitude of the phase-gradient-vector given as $|\vec{\theta}| = \sqrt{\theta_x^2 + \theta_x^2}$.

The processor 322 can also determine the amplitude of the wavefront at each of the apertures 114 (step 412). At each aperture 114 location (x, y), the processor 322 can sum up the intensity values of the light projection 128 associated with the aperture 114. For example, the processor 322 sums up the values from a corresponding grid of light detecting elements 122 assigned (mapped) to the particular aperture 114.

The processor 322 can generate one or more images of the object 300 based on the determined amplitude and/or phase gradient (step 414). For example, an intensity/amplitude image can be generated based on the amplitude information. As another example, a normalized phase gradient image along the x axis can be generated. As another example, a normalized phase gradient image along the y axis can be generated. As another example, a phase magnitude image can be generated. In yet another example, a phase gradient image along a selected direction $\vec{n}$ can be generated.

In one embodiment, phase and intensity images are determined separately. The intensity images are determined by pre-readout binning of relevant light detecting elements 122 (sensor pixels) during the intensity image acquisition step. This added step can reduce readout noise in the intensity image.

Modifications, additions, or omissions may be made to any of the above described methods without departing from the scope of the disclosure. Any of the methods described above may include more, fewer, or other steps. Additionally, steps may be performed in any suitable order without departing from the scope of the disclosure.

III. Computer Devices

Figure 14:
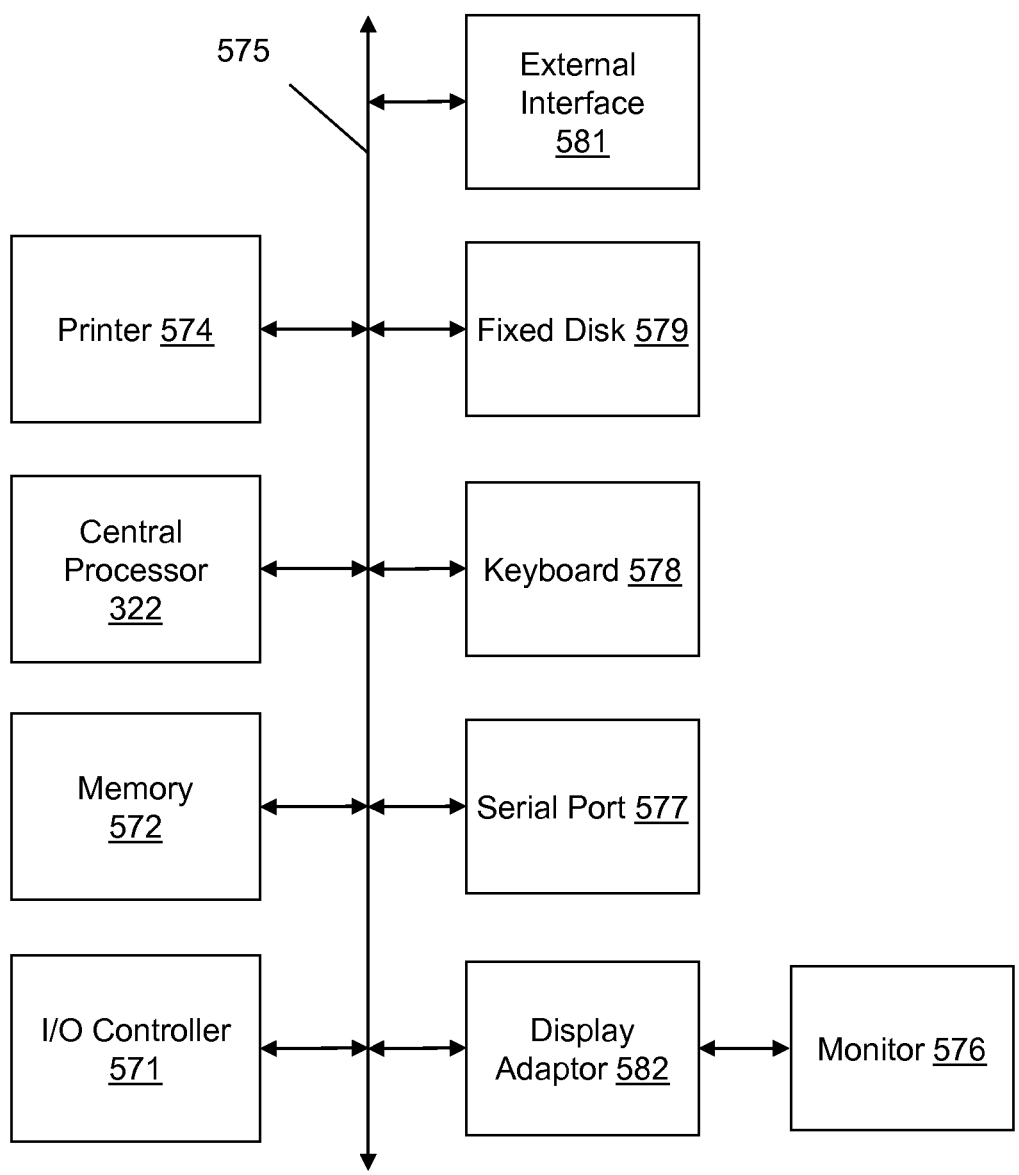
FIG. 14 shows a block diagram of subsystems that may be present in computer devices that are used in a WIS system, according to embodiments of the invention.

FIG. 14 shows a block diagram of subsystems that may be present in computer devices that are used in WIS system 200, according to embodiments of the invention. For example, the WIS system 200 may have a host computer 320 communicating with the WIS 100 that may use any suitable combination of components in FIG. 14.

The various components previously described in the Figures may operate using one or more computer devices to facilitate the functions described herein. Any of the elements in the Figures may use any suitable number of subsystems to facilitate the functions described herein. Examples of such subsystems or components are shown in a FIG. 14. The subsystems shown in FIG. 14 are interconnected via a system bus 575. Additional subsystems such as a printer 574, keyboard 578, fixed disk 579 (or other memory comprising computer readable media), monitor 576, which is coupled to display adapter 582, and others are shown. Peripherals and input/output (I/O) devices, which couple to I/O controller 571, can be connected to the computer system by any number of means known in the art, such as serial port 557. For example, serial port 577 or external interface 581 can be used to connect the computer apparatus to a wide area network such as the Internet, a mouse input device, or a scanner. The interconnection via system bus allows the central processor 322 to communicate with each subsystem and to control the execution of instructions from system memory 572 or the fixed disk 579, as well as the exchange of information between subsystems. The system memory 572 and/or the fixed disk 579 may embody a computer readable medium. Any of these elements may be present in the previously described features. A computer readable medium according to an embodiment of the invention may comprise code for performing any of the functions described above.

In some embodiments, an output device (e.g., the printer 574) of the WIS system 200 can output various forms of data. For example, the WIS system 200 can output a two-dimensional local intensity image map, a two-dimensional phase gradient image map in and x-direction, a two-dimensional phase gradient image map in and y-direction, and a two-dimensional reconstructed image.

It should be understood that the present invention as described above can be implemented in the form of control logic using computer software in a modular or integrated manner. Based on the disclosure and teachings provided herein, a person of ordinary skill in the art will know and appreciate other ways and/or methods to implement the present invention using hardware and a combination of hardware and software.

Any of the software components or functions described in this application, may be implemented as software code to be executed by a processor using any suitable computer language such as, for example, Java, C++ or Perl using, for example, conventional or object-oriented techniques. The software code may be stored as a series of instructions, or commands on a computer readable medium, such as a random access memory (RAM), a read only memory (ROM), a magnetic medium such as a hard-drive or a floppy disk, or an optical medium such as a CD-ROM. Any such computer readable medium may reside on or within a single computational apparatus, and may be present on or within different computational apparatuses within a system or network.

A recitation of "a", "an" or "the" is intended to mean "one or more" unless specifically indicated to the contrary.

The above description is illustrative and is not restrictive. Many variations of the disclosure will become apparent to those skilled in the art upon review of the disclosure. The scope of the disclosure should, therefore, be determined not with reference to the above description, but instead should be determined with reference to the pending claims along with their full scope or equivalents.

One or more features from any embodiment may be combined with one or more features of any other embodiment without departing from the scope of the disclosure. Further, modifications, additions, or omissions may be made to any embodiment without departing from the scope of the disclosure. The components of any embodiment may be integrated or separated according to particular needs without departing from the scope of the disclosure.

All patents, patent applications, publications, and descriptions mentioned above are hereby incorporated by reference in their entirety for all purposes. None is admitted to be prior art.

What is claimed is:

1. A wavefront imaging sensor comprising,
   an aperture layer having an aperture of set dimensions;
   a light detector having a surface, the light detector configured to receive a light projection at the surface from light passing through the aperture, the light detector further configured to separately measure amplitude and phase information of a wavefront based on the received light projection; and
   a transparent layer between the aperture layer and the light detector, the transparent layer having a thickness locating the surface of the light detector approximately at a self-focusing plane in a high Fresnel number regime to narrow the light projection.

2. The wavefront imaging sensor of claim 1, wherein the light detector measures the phase information of the wavefront at the aperture by estimating a lateral shift of the light projection and determining the phase information based on the estimated lateral shift.

3. The wavefront imaging sensor of claim 2,
   wherein the light detector comprises a plurality of light detecting elements, each light detecting element receiving a signal, and
   wherein the light detector estimates a lateral shift of the light projection by estimating a center of the projection on the surface of the light detector.

4. The wavefront imaging sensor of claim 2, wherein the light detector is configured to measure the phase information of the wavefront at one of the apertures by estimating a lateral shift of the light projection corresponding to the one of the apertures.

5. The wavefront imaging sensor of claim 1, wherein the light detector measures the amplitude information of the wavefront at the aperture by summing up the intensity signals over the light projection.

6. The wavefront imaging sensor of claim 1,
   wherein the light detector comprises a plurality of light detecting elements, each light detecting element receiving a signal, and
   wherein the light detector measures the amplitude information of the wavefront at the aperture by summing up the signals received by the light detecting elements.

7. The wavefront imaging sensor of claim 1, further comprising a processor communicatively coupled to the light detector, the processor configured to generate a phase image based on the measured phase information of the wavefront along a user defined direction.

8. The wavefront imaging sensor of claim 1, further comprising a processor communicatively coupled to the light detector, the processor configured to generate a phase image based on the measured phase information of the wavefront along an axis of the aperture layer.

9. The wavefront imaging sensor of claim 1, further comprising a processor communicatively coupled to the light detector, the processor configured to generate a phase image based on a magnitude of the phase gradient vector of the wavefront determined from the measured phase information of the wavefront.

10. The wavefront imaging sensor of claim 1, further comprising a lens at the aperture.

11. The wavefront imaging sensor of claim 1, wherein the light projection is a minimum light projection associated with the self-focusing plane.

12. The wavefront imaging sensor of claim 1, wherein the transparent layer extends from the aperture layer to the surface of the light detector.

13. The wavefront imaging sensor of claim 1, wherein the wavefront imaging sensor is in the form of a wavefront imaging sensor chip.

14. A wavefront imaging sensor comprising,
an aperture layer having an array of apertures of set dimensions;
a light detector having a surface, the light detector configured to receive one or more light projections at the surface from light passing through the array of apertures, the light detector further configured to separately measure amplitude and phase information of a wavefront based on the received one or more light projections; and
a transparent layer between the aperture layer and the light detector, the transparent layer having a thickness locating the surface of the light detector approximately at a self-focusing plane in a high Fresnel number regime to narrow the one or more light projections.

15. The wavefront imaging sensor of claim 14, wherein the apertures in the array of apertures are closely spaced.

16. The wavefront imaging sensor of claim 14, wherein the light detector includes a plurality of arrays of light detecting elements, wherein each array of light detecting elements is assigned to an aperture.

17. The wavefront imaging sensor of claim 14, wherein the light detector measures the amplitude information of the wavefront at one of the apertures by summing up the intensity signals received by the array of light detecting elements assigned to the one of the apertures.

18. The wavefront imaging sensor of claim 14, wherein the transparent layer extends from the aperture layer to the surface of the light detector.

19. A method for separately measuring the amplitude and phase gradient of a wavefront using a wavefront imaging sensor having an aperture layer, a light detector and a transparent layer between the aperture layer and the light detector, the method comprising:
receiving a light projection at a surface of the light detector, the light projection from light passing through an aperture of the aperture layer, wherein the aperture has set dimensions, and wherein the surface is located approximately at a self-focusing plane in a high Fresnel number regime to narrow the light projection;
estimating a lateral shift of the light projection by estimating a center of the light projection on the surface;
measuring the phase gradient of the wavefront at the aperture using the estimated lateral shift of the light projection; and
measuring the amplitude of the wavefront at the aperture by summing up intensity signals received by the light detecting elements assigned to the aperture.

20. The method of claim 19, wherein the transparent layer extends from the aperture layer to the surface of the light detector.

* * * * *